United States Patent
Jin et al.

(10) Patent No.: US 10,048,768 B2
(45) Date of Patent: Aug. 14, 2018

(54) SYSTEMS AND METHODS FOR DETERMINING INPUT MOVEMENT

(71) Applicant: Sharp Laboratories of America, Inc., Camas, WA (US)

(72) Inventors: Hong Jin, Vancouver, WA (US); Atsushi Ishii, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 111 days.

(21) Appl. No.: 15/004,230

(22) Filed: Jan. 22, 2016

(65) Prior Publication Data

US 2017/0212596 A1 Jul. 27, 2017

(51) Int. Cl.
- *G06F 3/033* (2013.01)
- *G06F 3/01* (2006.01)
- *G06F 3/0346* (2013.01)
- *G06F 3/0489* (2013.01)

(52) U.S. Cl.
CPC ............ *G06F 3/017* (2013.01); *G06F 3/0346* (2013.01); *G06F 3/04897* (2013.01); *G06F 2203/0331* (2013.01)

(58) Field of Classification Search
CPC ..... G06F 3/0346; G06F 3/017; G06F 3/04897
See application file for complete search history.

(56) References Cited

U.S. PATENT DOCUMENTS

| | | | |
|---|---|---|---|
| 8,442,797 B2 | 5/2013 | Kim et al. | |
| 8,814,811 B2 | 8/2014 | Scholten et al. | |
| 9,008,995 B2* | 4/2015 | Lee | G01P 1/127 702/141 |
| 9,106,275 B2 | 8/2015 | Griffin et al. | |
| 2010/0304754 A1 | 12/2010 | Czompo et al. | |
| 2013/0183646 A1* | 7/2013 | Lusted | G09B 19/00 434/236 |
| 2014/0071046 A1* | 3/2014 | Mucignat | G06F 1/1626 345/156 |
| 2014/0085055 A1* | 3/2014 | Lee | G06Q 10/06 340/10.5 |
| 2014/0163334 A1 | 6/2014 | Volpe et al. | |
| 2016/0034742 A1* | 2/2016 | Kim | H04B 1/385 382/124 |

FOREIGN PATENT DOCUMENTS

WO 2015/0129556 A1 9/2015

* cited by examiner

*Primary Examiner* — Towfiq Elahi
(74) *Attorney, Agent, or Firm* — ScienBizIP, P.C.; Steve Reiss

(57) ABSTRACT

An electronic device for detecting input movement is described. The electronic device includes a processor. The processor is configured to obtain an acceleration signal from a finger-mounted device. The processor is also configured to obtain a rotation signal from the finger-mounted device. The processor is further configured to determine an input movement based on at least one peak of at least one of the acceleration signal and the rotation signal.

16 Claims, 22 Drawing Sheets

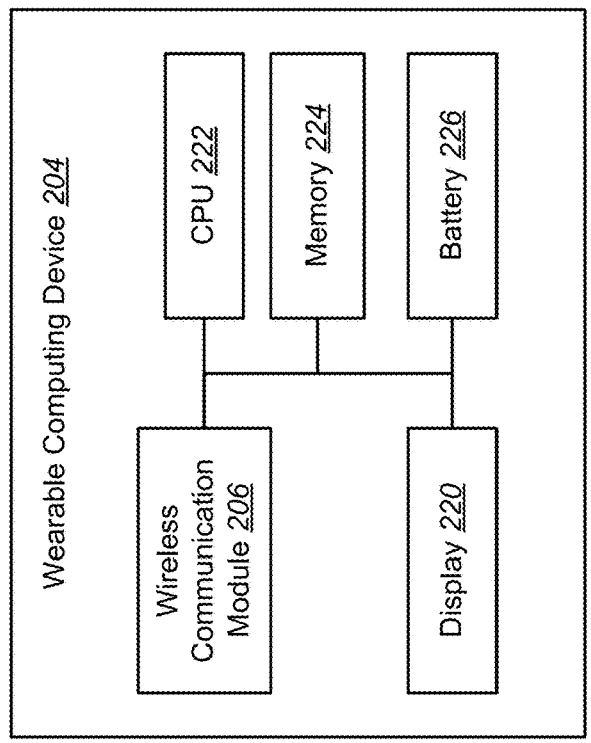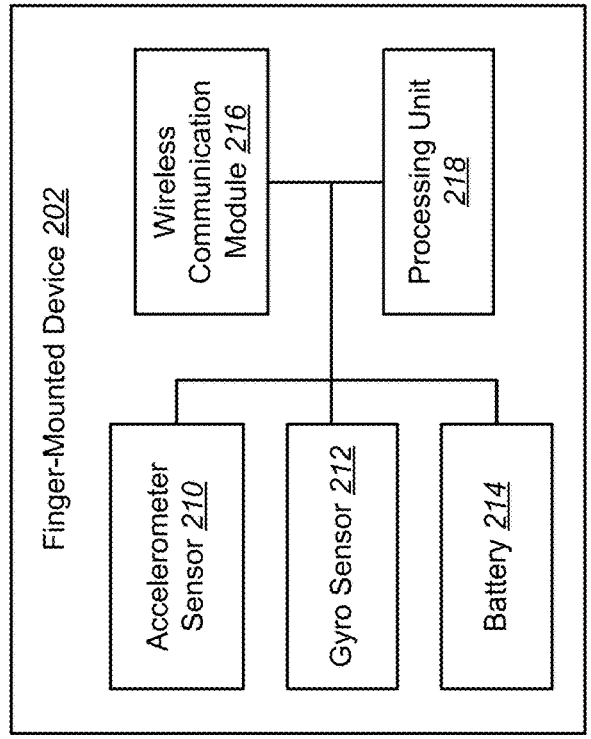
FIG. 2

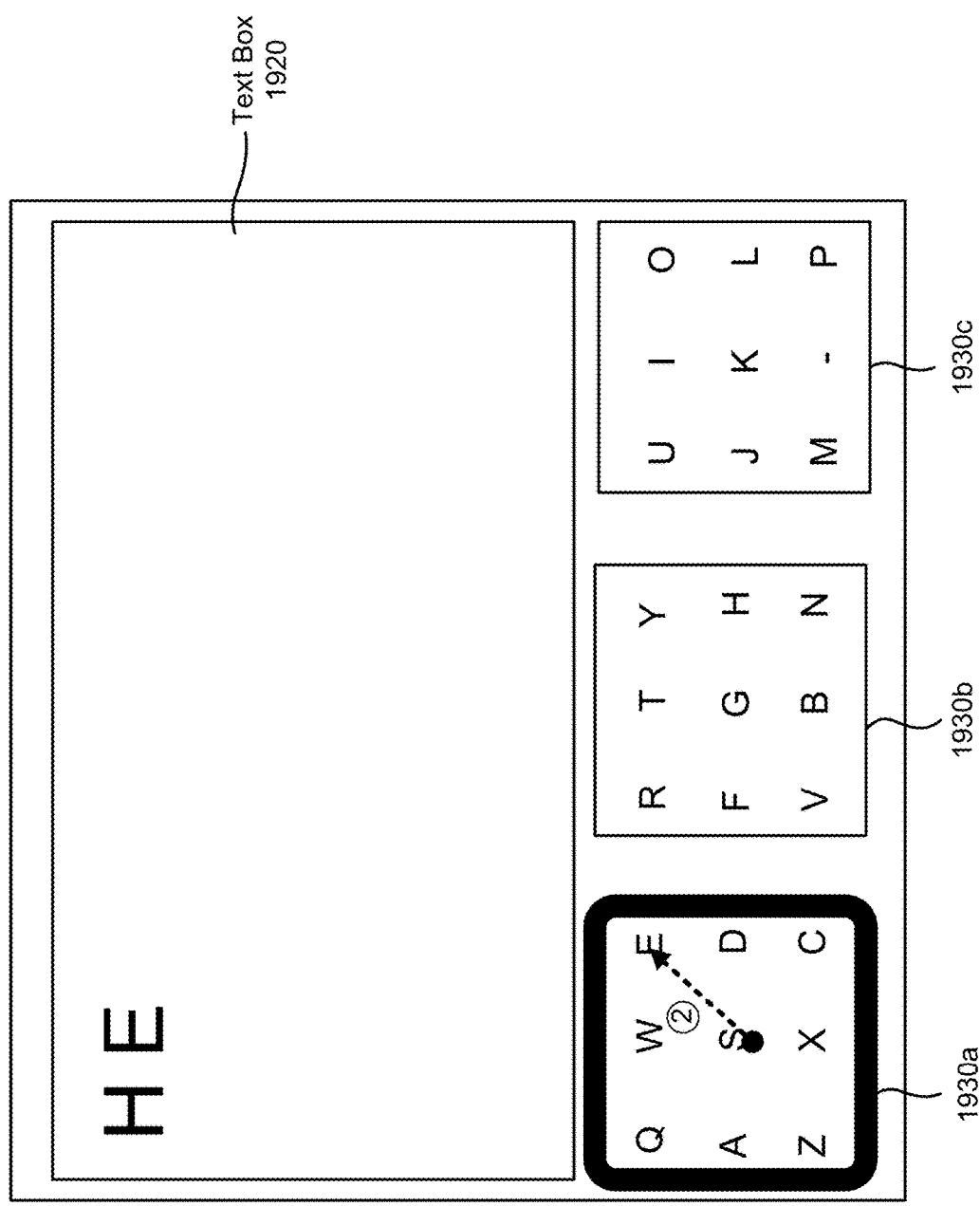

SYSTEMS AND METHODS FOR DETERMINING INPUT MOVEMENT

TECHNICAL FIELD

The present disclosure relates generally to electronic devices. More specifically, the present disclosure relates to systems and methods for determining input movement for an application (e.g., text entry).

BACKGROUND

The use of electronic devices has become commonplace in modern society. Electronic devices have become smaller and more powerful in order to meet consumer needs and to improve portability and convenience. Electronic devices that are commonly used include computing devices, such as personal computers or laptops. Other electronic devices commonly used include cellular phones, smart phones, Personal Digital Assistants, tablet devices, netbooks, e-readers, Global Positioning Satellite (GPS) units, etc. Consumers have become dependent upon electronic devices and have come to expect increased functionality.

Wearable computers, or small computer devices to be worn on a human body, such as watches, glasses, smart shoes, etc., are becoming increasingly popular. However, the majority of such computers still exist as accessories of smartphones rather than standalone devices. There are several technical issues that must be addressed for wearable computers to enable them to be used as mainstream standalone devices. Such issues include short battery life, limited network connectivity and small display space, among other technical issues.

One difficult issue with electronic devices is the cumbersomeness of interacting with wearable computers. Unlike smartphones or tablet devices, wearable computers in general may not have a sufficient space or even no space to display a keypad or keyboard large enough for users to operate comfortably to enter text using fingers. As can be seen from this discussion, systems and methods that improve electronic device interfaces may be beneficial.

BRIEF DESCRIPTION OF THE DRAWINGS

FIG. 2 is a block diagram illustrating various components that may be utilized in a finger-mounted device and/or a wearable computing device;

FIG. 19B is a diagram illustrating an example of a step in the process for using a finger-mounted device to enter the word "HELLO" on a wearable device;

DETAILED DESCRIPTION

Figure 1:
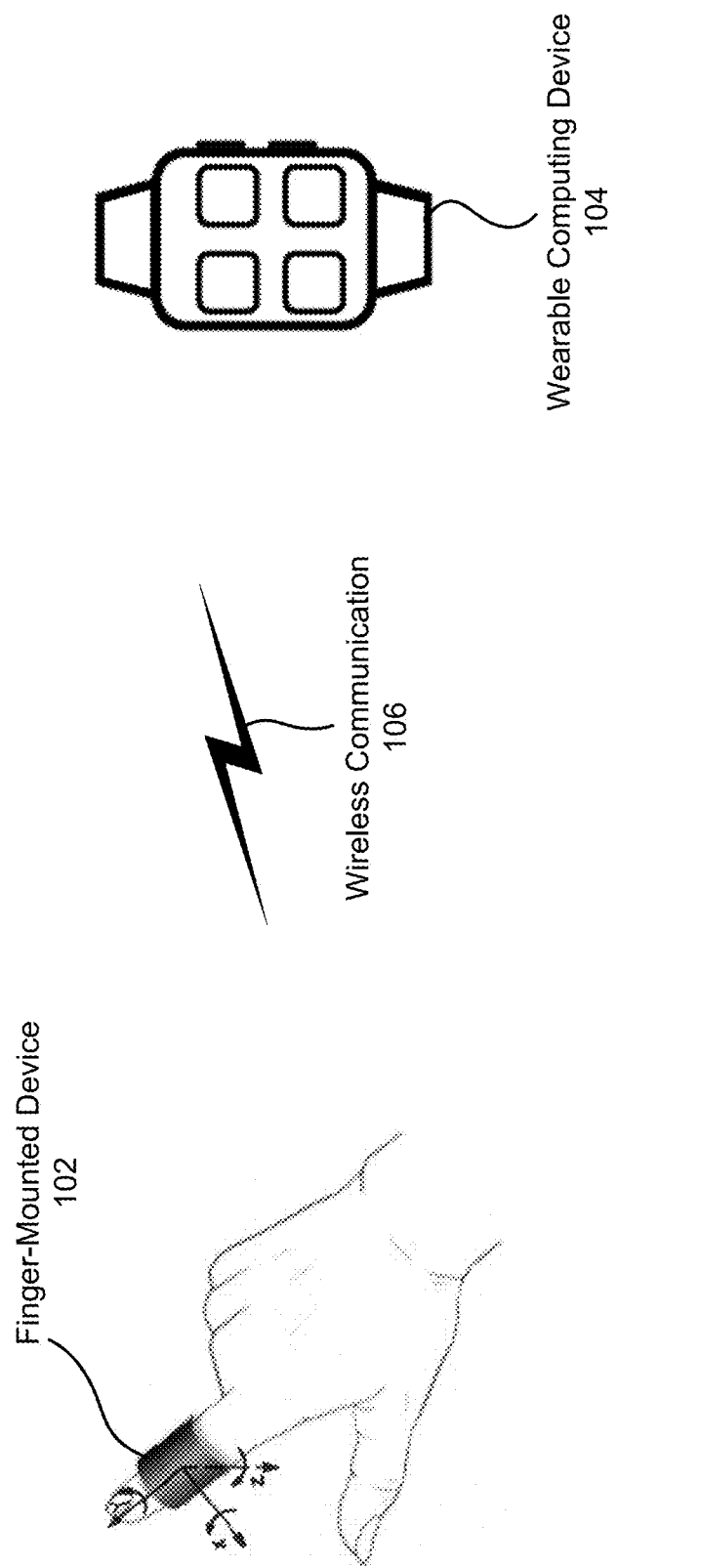
FIG. 1 is a diagram illustrating examples of a finger-mounted device and/or a wearable device for determining input movement.

An electronic device for detecting input movement is described. The electronic device includes a processor configured to obtain an acceleration signal from a finger-mounted device. The processor is also configured to obtain a rotation signal from the finger-mounted device. The processor is further configured to determine an input movement based on at least one peak of at least one of the acceleration signal and the rotation signal.

The processor may be configured to pre-process the acceleration signal and the rotation signal. The processor may be configured to determine whether a tap is detected based on at least one of the acceleration signal and the rotation signal. The processor may be configured to determine whether a peak amplitude of the acceleration signal is higher than a tap threshold to determine whether a tap is detected.

The processor may be configured to determine whether a directional movement is detected based on at least one of the acceleration signal and the rotation signal. The processor may be configured to determine whether a positive peak amplitude of the acceleration signal is greater than a positive peak threshold and to determine whether a negative peak amplitude of the acceleration signal is less than a negative peak threshold. The processor may be configured to determine a left movement in a case that the positive peak occurs before the negative peak or a right movement in a case that the negative peak occurs before the positive peak. The processor may be configured to determine an up movement based on a rotational signal peak and an accelerometer signal peak.

The electronic device may be the finger-mounted device or may be a separate electronic device. The processor may be configured to select a key based on the input movement. The processor may be configured to present visual feedback for the input movement on a display.

A method for detecting input movement is also described. The method includes obtaining an acceleration signal from a finger-mounted device. The method also includes obtaining a rotation signal from the finger-mounted device. The method further includes determining an input movement based on at least one peak of at least one of the acceleration signal and the rotation signal.

A non-transitory computer-readable medium with instructions is also described. The computer-readable medium includes code for causing an electronic device to obtain an acceleration signal from a finger-mounted device. The computer-readable medium also includes code for causing the electronic device to obtain a rotation signal from the finger-mounted device. The computer-readable medium further includes code for causing the electronic device to determine an input movement based on at least one peak of at least one of the acceleration signal and the rotation signal.

One difficult issue with electronic devices is the cumbersomeness of interacting with wearable computers. Unlike smartphones or tablet devices, wearable computers in general do not have a sufficient space or even no space to display a keypad or keyboard large enough for users to operate comfortably with fingers. Even with this issue, some smart watch devices incorporate a touch panel on the display and present a miniature keypad/keyboard. In this case, the usability of text entry is highly degraded. In other cases, voice recognition is adopted as an alternative solution, which is not considered to be practical to use in a noisy public environment. In addition, gesture control, which is a technique to capture the visual image of body movements or shapes and graphically analyze user intentions, requires a large amount of processing power and is currently limited to simple command control, such as audio volume up/down. Furthermore, one approach requires users to write letters in the air and captures the strokes using motion sensors built into a finger-mounted device. This approach also requires a large amount of processing power in order to analyze strokes and perform pattern matching using large character sets. In general, approaches that require large amounts of processing power are likely to be unsuitable for wearable computers that have limited battery capacity.

The systems and methods disclosed herein may relate to determining input movement. For example, some configurations of the systems and methods disclosed herein may provide easy-to-use and practical input (e.g., text entry) solutions for wearable computer devices. For instance, a finger-mounted device (e.g., finger ring-like sensor device, motion sensing device, etc.) that is equipped with motion sensors may be utilized to detect a user's finger movements. One feature of the systems and methods disclosed herein may relate to detecting a user's intention to hit (e.g., click) a selected key based on the finger motion. Some approaches described herein may provide a simple and accurate way for determining a user's movement intention for applications such as text entry.

A typical displacement measurement algorithm using an accelerometer is based on the theory of classical mechanics. Specifically, classical mechanics express the relationship between displacement, velocity, acceleration and time using differentiation. The speed is the rate of change in position, while acceleration is the rate of change in velocity. As integration is the inverse operator of differentiation, if the acceleration of an object is known, the displacement can be obtained after double integration is applied.

Applying double integration of accelerometer data for displacement measurement may be challenging for the application of text entry with a finger-mounted device. Specifically, the finger's movement may be relatively small. The displacement measurement accuracy may need to be relatively high to detect a user's intention for text entry. The free space finger natural rotation may need a rotation matrix to adjust raw accelerometer data. The accuracy of the integration may be highly dependent on the area surrounded by the function curve and the axis. In other words, any filter or pre-processing that could distort the shape of the curve may affect the results of the integration and the displacement estimation. For example, filtering or pre-processing may cause decreased measurement accuracy and/or may utilize a complex algorithm.

Some configurations of the systems and methods disclosed herein may offer simple and practical algorithms to detect movement in a device equipped with an accelerometer and/or gyro sensor, such as a text entry system. In a text entry system, a finger-mounted device equipped with an accelerometer and gyroscope (gyro) sensors may be worn on the user (e.g., a human finger). This may enable key selection on a virtual keyboard/keypad to enter text based on determining movement of the finger that wears the finger-mounted device in free space. In some approaches, a pre-defined limited set of movements may be utilized, such as moving left, moving right, tapping on a physical surface, a tap followed by an up, down, left or right movement (e.g., gesture). In some approaches, the set may include diagonal movements (e.g., up-right, up-left, down-left and/or down-right, etc.). Instead of a complex approach measuring displacement by integration, some configurations of the systems and methods disclosed herein may use characteristics of acceleration peaks detected from the sensor data.

Some configurations of the systems and methods disclosed herein may detect movement based on one or more of the following data, signals, signal characteristics and/or procedures. For example, the peak amplitude of acceleration and rotation signals, the positive versus negative peak of acceleration and rotation signals, the order of peaks occurring in acceleration and rotation signals and/or a time interval between acceleration and rotation signal peaks may be utilized to determine movement. Some configurations of the systems and methods may combine one or more of the aforementioned information and/or signal characteristics to determine the movement of the finger. Additionally or alternatively, some configurations of the systems and methods may combine one or more above mentioned information and/or signal characteristics to determine the length of a movement of the finger.

Some configurations of the systems and methods disclosed herein may be implemented in a computer device (e.g. a wearable computer). The computer device may have a display means. For example, a virtual keyboard/keypad may be presented on the display when text entry is needed. A letter or a plurality of letters may be pre-assigned to each key of the keyboard/keypad. To determine the key currently selected on the keyboard/keypad, a procedure may be implemented in the computer device that utilizes visual feedback on the display means to show the currently selected key. The currently selected key may be recognized by a procedure to detect a user's intention to hit (e.g., click) the selected key by capturing designated finger motions, such as tapping and/or swiping. The finger motions may be analyzed after designated motions are recognized in order to determine the text entry (e.g., letter) from the pre-assigned letters that are most likely to be entered by the user.

In some configurations, the user may select and hit the keys on the virtual keyboard/keypad to enter text by moving the finger that wears the finger-mounted device in free space, on a tabletop or anywhere he/she likes. Since the user does not need to physically touch the keyboard/keypad on the display, the approach presented in the present systems and methods may work even in the case where the keyboard/keypad is too small to be operated by the finger or is physically inaccessible. Furthermore, since no image processing or complex pattern matching may be required, some configurations of the systems and methods disclosed herein may be implemented with limited processing power compared to currently existing products, making it practical for devices with limited battery capacity.

Various examples of the systems and methods disclosed herein are now described with reference to the figures, where like reference numbers may indicate functionally similar elements. The systems and methods as generally described and illustrated in the figures herein could be arranged and designed in a wide variety of different implementations. Thus, the following more detailed description of several implementations, as represented in the figures, is not intended to limit scope, as claimed, but is merely representative of the systems and methods.

FIG. 1 is a diagram illustrating examples of a finger-mounted device 102 and/or a wearable computing device 104 for determining input movement. A finger-mounted device 102 (e.g., finger-mounted device, finger ring-like sensor device, finger-mounted motion sensor, etc.) worn on a single finger senses finger movements. The finger-mounted device 102 may include an accelerometer and/or gyroscope (gyro) sensors. In some configurations, the finger-mounted device 102 may detect input movement independently. Additionally or alternatively, the finger-mounted device 102 may communicate wirelessly 106 with the wearable computing device 104 using a wireless communication technology, such as Bluetooth, that is used for sending the sensed finger movements to the wearable computing device 104. The wearable computing device 104 may detect input movement based on the sensed finger movements from the finger-mounted device. For example, the wearable computing device 104 may translate the movements into one or more keys and outputs the key entry on the wearable computing device 104 display. It some configurations, the input movement may be determined (e.g., selected) from a set of input movements (e.g., a pre-defined set of input movements).

As illustrated in FIG. 1, the finger-mounted device 102 may have an associated coordinate system for the accelerometer and gyro sensors. For example, the Y axis may extend along the finger-mounted device 102, the X axis may extend to the sides of the finger-mounted device 102 and the Z axis may extend above and below the finger-mounted device 102. For example, the accelerometer +X is pointing to the left, +Y is pointing forward (along the finger, for example) and +Z is pointing down. Each gyroscope channel measures the rotation around one of the accelerometer axes. For instance, a 3-axis gyroscope may measure the rotation around the X, Y and Z axes. The examples of accelerometer and gyroscope signals given herein may be based on the coordinate system shown in FIG. 1. However, it should be noted that other coordinate system arrangements may be utilized and/or implemented in accordance with the systems and methods disclosed herein.

Although a wearable computing device 104 is illustrated in FIG. 1, it should be noted that the finger-mounted device 102 may additionally or alternatively communicate with one or more other devices (e.g., wireless communications devices, smart phones, laptop computers, cellular phones, tablet devices, virtual reality (VR) devices (e.g., VR headsets), augmented reality (AR) devices, smart glasses, desktop computers, televisions, gaming consoles, smart appliances, etc.). The one or more other devices may additionally or alternatively detect input movement based on the movement sensed by the finger-mounted device 102. Accordingly, the systems and methods disclosed herein may be implemented independently on a finger-mounted device 102, on a wearable computing device 104 and/or on one or more other devices, depending on the configuration. For example, the finger-mounted device 102 may communicate sensor data (e.g., acceleration signal(s) and/or gyroscope signal(s)), which may enable another device to determine an input movement. Additionally or alternatively, the finger-mounted device may communicate input movements (e.g., up, down, left, right, tap, tap-up, tap-down, tap-right, tap-left, short left, long left, short right, long right, short up, long up, short down and/or long down, etc.) determined based on the sensor data.

FIG. 2 is a block diagram illustrating various components that may be utilized in a finger-mounted device 202 and/or a wearable computing device 204. It should be noted that the systems and methods disclosed herein may be implemented on a finger-mounted device 202, a wearable computing device 204 and/or one or more other devices (e.g., alternatively to the wearable computing device 204 as described in connection with FIG. 1). It should also be noted that one or more of the elements illustrated in the finger-mounted device 202 and/or the wearable computing device 204 may be optional (e.g., may not be implemented in some configurations). One or more other devices may be alternatively implemented instead of the wearable computing device 204. The one or more other devices may include one or more elements similar to the wearable computing device 204 described in connection with FIG. 2.

The finger-mounted device 202 may include one or more sensors capable of sensing movement. For example, the finger-mounted device 202 may include an accelerometer sensor 210 and/or a gyroscope (gyro) sensor 212 to sense movement of the finger-mounted device 202. Other sensors may also be used to sense movement.

The finger-mounted device 202 (e.g., finger-mounted sensor device 202) may include a wireless communication module 216 and/or a processor or processing unit 218. The wireless communication module 216 enables the sensor device 202 to communicate using various wireless communication technologies such as Institute of Electrical and Electronics Engineers (IEEE) 802.11, IEEE 802.16, Bluetooth, Zigbee (IEEE 802.15.4), Zwave, or any cellular communication network. The processor or processing unit 218 may comprise a microcontroller that may be coupled to the accelerometer sensor 210 and gyroscope sensor 212. The processing unit 218 may receive the signals captured by the one or more sensors 210, 212. In some configurations, the finger-mounted device 202 may detect input movement (e.g., determine one or more gestures) based on the signals (e.g., acceleration signal and/or gyro signal). For example, the finger-mounted device 202 may process the information and translates it into one of a set of input movements (e.g., up, down, left, right, tap, tap-up, tap-down, tap-right, tap-left, short left, long left, short right, long right, short up, long up, short down and/or long down, etc.). It should be noted that the set of movements may include one or more axial directions (e.g., up, down, left, right) and/or one or more off axial directions (e.g., diagonal, up-right, up-left, down-left, down-right) with or without taps and/or with or without long/short characterization in some configurations. The input movement may be utilized by the finger-mounted device 202 to determine a key entry or key selection. Additionally or alternatively, the processing unit 218 may wirelessly transmit the signals to the wearable computing device 204. The device 202 may further include one or more batteries 214 to provide power to the device 202.

The wearable computing device 204 comprises a wireless communication module 206, central processing unit (CPU) 222, memory 224, battery 226 and display 220. The wireless communication module 206 is similar to, and communicates with, the wireless communication module 216 of the sensor device 202 using a wireless communication technology to facilitate communication with the finger-mounted device 202 to receive the gesture information detected. The wearable computing device 204 may detect input movement based on the signals received from the finger-mounted device 202. For example, the wearable computing device 204 (or another device) may receive sensor data (e.g., accelerometer signal(s) and/or gyroscope signal(s)), which the wearable computing device 204 may utilize to determine an input movement. In another example, the wearable computing device 204 (or another device) may receive input movement data that identifies one or more specific gestures. In some configurations, the wearable computing device 204 may process the information (e.g., the input movement(s)) and translates it into a key entry or key selection and outputs the key entry on the display 220 of the wearable computing device 204. The wearable computing device 204 may be an embedded system.

The wearable computer device 204 may also include a display 220. The display 220 may show a visual representation of a mode of data entry in some configurations. For example, the display 220 may show a representation of a set of keys, a partial keyboard or a full keyboard to a user. The display 220 may include one or more means for displaying visual information. For example, the display 220 may include a light emitting diode (LED), an LED array, a multi-color LED array, a liquid crystal display (LCD) or other structure that conveys visual information. In some configurations, the wearable computing device 204 (e.g., CPU 222 and/or display 220, etc.) may present visual feedback for the input movement on the display 220. For example, the display 220 may provide visual feedback of the user input activity in real time. In some approaches, the wearable computing device 204 may present one or more images, icons, lines, visual effects, etc., that illustrate the detected and/or determined input movement.

Examples of wearable computing devices 204 include smart watches, smart glasses, smart shoes, etc. Generally, a wearable computing device 204 is an electronic device that can be worn by a user and that includes a processor or CPU 222.

Figure 3:
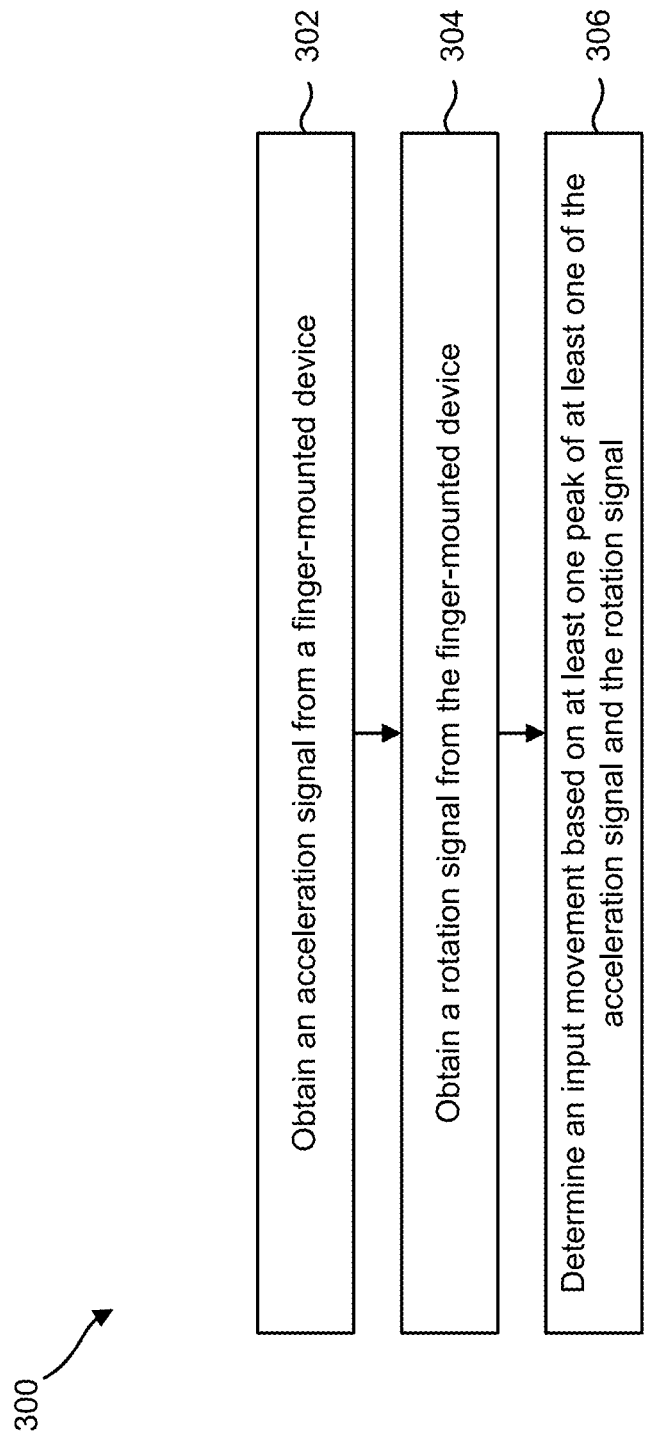
FIG. 3 is a flow diagram illustrating one configuration of a method for determining input movement.

FIG. 3 is a flow diagram illustrating one configuration of a method 300 for determining input movement. The method 300 may be performed by a finger mounted device 102, 202, by a wearable computing device 104, by one or more other devices (e.g., smart phones, laptop computers, tablet devices, desktop computers, gaming systems, etc.), a combination of a finger-mounted device 102, 202 and a wearable computing device 104, 204 and/or a combination of a finger-mounted device 102, 202 and one or more other devices.

A device (e.g., a finger-mounted device 102, 202, a wearable computing device 104, 204 and/or another device) may obtain 302 an acceleration signal from a finger-mounted device 102, 202. For example, the finger-mounted device 102, 202 may sense movement with one or more accelerometers. The sensed movement may be indicated with one or more acceleration signals (from the accelerometer(s)). In some configurations, the finger-mounted device 102, 202 itself may obtain the acceleration signal(s) from the one or more accelerometers that are included in the finger-mounted device. In some configurations, the finger-mounted device 102, 202 may send the acceleration signal(s) to another device (e.g., to a wearable computing device, a smart phone, a tablet device, a laptop computer, a desktop computer, etc.). Accordingly, the other device may obtain 302 one or more acceleration signals from the finger-mounted device by requesting and/or receiving the acceleration signal(s) from the finger-mounted device.

The device may obtain 304 a rotation signal from the finger-mounted device 102, 202. For example, the finger-mounted device 102, 202 may sense movement with one or more gyroscope sensors. The sensed movement may be indicated with one or more rotation signals (from the gyroscope sensor(s)). In some configurations, the finger-mounted device 102, 202 itself may obtain the rotation signal(s) from the one or more gyroscope sensors that are included in the finger-mounted device. In some configurations, the finger-mounted device 102, 202 may send the rotation signal(s) to another device (e.g., to a wearable computing device, a smart phone, a tablet device, a laptop computer, a desktop computer, etc.). Accordingly, the other device may obtain 304 one or more rotation signals from the finger-mounted device by requesting and/or receiving the rotation signal(s) from the finger-mounted device.

The device (e.g., a finger-mounted device 102, 202, a wearable computing device 104, 204 and/or another device) may determine 306 an input movement based on at least one peak of at least one of the acceleration signal and the rotation signal. For example, the device may determine an input movement based on the peak amplitude of one or more acceleration signals, the peak amplitude of one or more rotation signals, the positive versus negative peak of acceleration and/or rotation signals, the order of peaks occurring in acceleration and/or rotation signals and/or a time interval between peaks in acceleration and/or rotation signals. For example, the device may determine 306 whether one or more peaks in the acceleration and/or rotation signals indicate a tap, a left movement (e.g., short left movement or long left movement), a right movement (e.g., short right movement or long right movement), an up movement, a down movement and/or a combination (e.g., tap-up, tap-down, tap-right, tap-left, etc.). More detailed examples of determining 306 an input movement are given in connection with one or more of FIGS. 4-16. It should be noted that determining 306 an input movement may not include integrating a signal (e.g., double integration) in some configurations. Additionally or alternatively, the only signal characteristic used for determining 306 an input movement may include signal peak(s) (e.g., peak amplitude, peak timing, timing between peaks, sequence of peaks) in some configurations. For example, other signal shape characteristics may not be utilized to determine 306 an input movement in some configurations.

In some configurations, the method 300 may include presenting visual feedback for the input movement on a display (e.g., the display 220). For example, visual feedback of the user input activity may be provided in real time. In some approaches, the method 300 may include presenting one or more images, icons, lines, visual effects, etc., that illustrate the detected and/or determined input movement.

Figure 4:
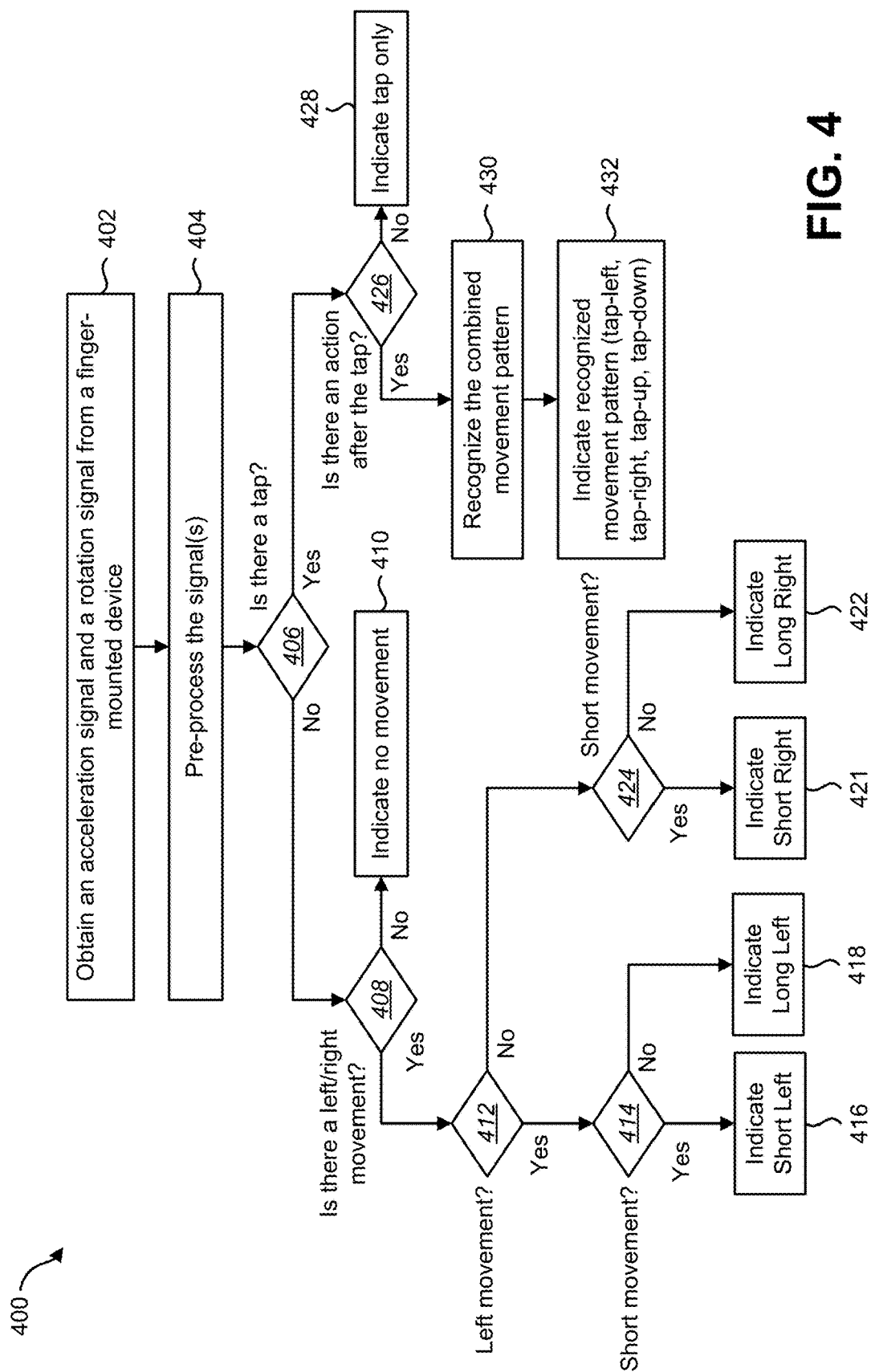
FIG. 4 is a flow diagram illustrating a more specific configuration of a method for determining an input movement.

FIG. 4 is a flow diagram illustrating a more specific configuration of a method 400 for determining an input movement. For example, the method 400 is an example of an approach that may be used to determine input movements and/or combinations of input movements. The method 400 may determine input movements based on one or more peaks (e.g., peak detection).

The method 400 may be performed by a finger mounted device 102, 202, by a wearable computing device 104, by one or more other devices (e.g., smart phones, laptop computers, tablet devices, desktop computers, gaming systems, etc.), a combination of a finger-mounted device 102, 202 and a wearable computing device 104, 204 and/or a combination of a finger-mounted device 102, 202 and one or more other devices.

A device (e.g., a finger-mounted device 102, 202, a wearable computing device 104, 204 and/or another device) may obtain 402 an acceleration signal (e.g., accelerometer signal) and a rotation signal (e.g., gyro signal) from a finger-mounted device 102, 202. This may be accomplished as described in connection with one or more of FIGS. 1-3. For example, a device may read signals from an accelerometer and gyro sensor.

The device may optionally pre-process 404 the signal(s). For example, raw acceleration and/or rotation signals (from the accelerometer(s) and/or gyro sensor(s)) may be pre-processed 404 before performing further movement determination. In some configurations, the pre-processing 404 may include offset correction, high pass filtering, interpolation, moving averaging and/or shimmy removal. A more detailed example of signal pre-processing 404 is given in connection with FIG. 5.

The device may determine 406 whether there is a tap. For example, the device may determine whether one or more of the acceleration and/or rotation signal(s) have a peak amplitude that is greater than a tap threshold. One specific example of tap movement determination is given in connection with FIG. 8.

If there is no tap (e.g., no tap is detected, no peak amplitude is greater than the tap threshold, etc.), the device may determine 408 whether there is a sideways (e.g., left/right) movement. For example, the device may determine 408 whether one or more of the acceleration and/or rotation signal(s) have peaks that go beyond their respective thresholds (e.g., left movement threshold, right movement threshold, etc.). Some examples of sideways movements are given in connection with FIGS. 13-16.

If no sideways movement is detected, the device may indicate 410 no movement. For example, the device may generate an indicator (e.g., a signal, a parameter, etc.) that indicates no movement. Alternatively, the device may not generate an explicit indicator, where absence of an explicit indicator may indicate no movement.

If a sideways movement is detected, the device may determine 412 whether the sideways movement is a left movement. For example, the device may determine an order of peaks. In some examples, the device may determine 412 that a left movement has occurred if a positive peak occurs before a negative peak and/or may determine 412 that a right movement has occurred if a negative peak occurs before a positive peak.

If a left movement is detected, the device may determine 414 whether the left movement is a short movement. For example, a short movement may have peaks that occur closer in time than a long movement. In some configurations, the device may determine that a short movement has occurred if a time difference between peaks is less than a time difference threshold. If a short movement is detected, the device may indicate 416 a short left movement. If a short movement is not detected, the device may indicate 418 a long left movement.

If a left movement is not detected (or if a right movement is detected), the device may determine 424 whether the right movement is a short movement. For example, a short movement may have peaks that occur closer in time than a long movement. In some configurations, the device may determine that a short movement has occurred if a time difference between peaks is less than a time difference threshold. If a short movement is detected, the device may indicate 421 a short right movement. If a short movement is not detected, the device may indicate 422 a long right movement. It should be noted that the same or different time difference thresholds may be utilized for left and right movements to determine short or long movements.

If a tap is detected, the device may determine 426 whether there is an action after the tap. For example, the device may determine whether there are one or more peaks in one or more acceleration and/or rotation signal(s) to determine whether there is movement after a tap. If no action is detected after the tap (e.g., in an amount of time after the tap), the device may indicate 428 tap only. For example, the device may generate an indicator (e.g., signal, parameter, etc.) that indicates a tap.

If action after the tap is detected, the device may recognize 430 the combined movement pattern. For example, the device may compare one or more peaks with one or more thresholds, may determine how much larger a peak is beyond a threshold and/or may determine an order of peaks in one or more acceleration and/or rotation signals. In some configurations, the device may select a movement type that most closely matches the movement pattern. The device may indicate 432 the recognized movement pattern (e.g., tap-left, tap-right, tap-up, tap-down, etc.). It should be noted that other patterns and/or directions may be determined and/or indicated. For example, diagonal directions, circular patterns and/or multi-finger patterns may be determined and/or indicated.

In some configurations, the movement indication (e.g., left, right, short left, long left, short right, long right, tap only, tap-left, tap-right, tap-up, tap-down, etc.) may be utilized to control an interface. For example, the movement indicators may indicate a scrolling direction and/or speed. Additionally or alternatively, the movement indicators may indicate a selection. For example, the movement indicators may be utilized in applications such as text entry as described herein.

In some configurations, a calibration procedure may be utilized that guides the user to go through a series of movements, such as rest, tap, tap-up, tap-down, tap-left, tap-right, etc. The calibration procedure may improve input movement determination accuracy. In some configurations, the calibration procedure may be part of the method 400 or may be performed independently (e.g., offline, previous to execution of the method 400, etc.). The rest period may provide information related to accelerometer and/or gyro sensors natural shimmy, drift and/or earth gravity reading. This information may be used in the signal pre-processing 404 to remove offset and shimmy. The calibration procedure may also collect information about the signal characteristics and may generate threshold values to be utilized in the movement determination.

Figure 5:
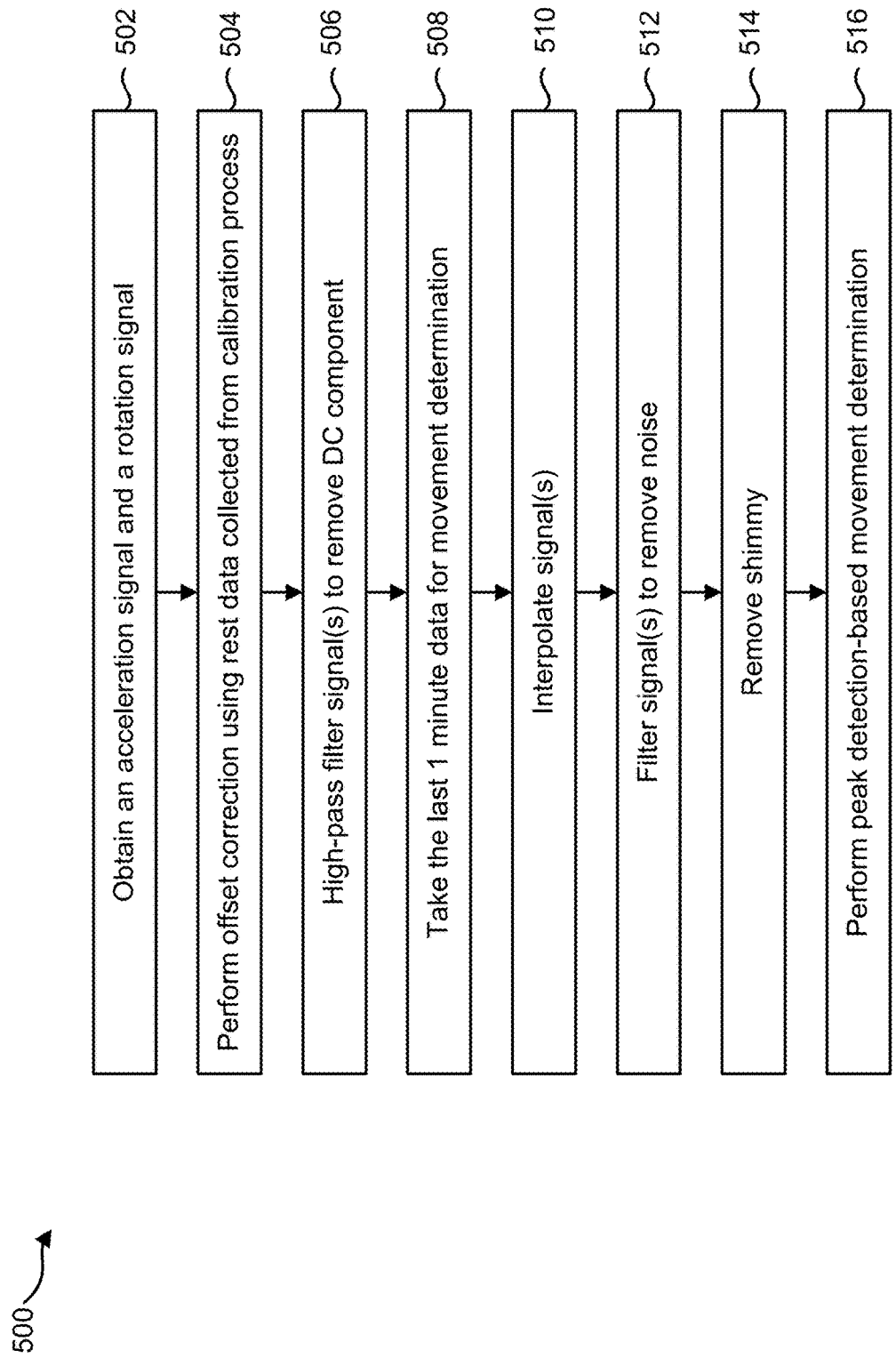
FIG. 5 is a flow diagram illustrating one configuration of a method for signal pre-processing.

FIG. 5 is a flow diagram illustrating one configuration of a method 500 for signal pre-processing. For example, the method 500 may be a procedure for accelerometer and/or gyro signal pre-processing. The method 500 may include an example of pre-processing 404 the signal(s) as described in connection with FIG. 4. The method 500 may be performed by a finger mounted device 102, 202, by a wearable computing device 104, by one or more other devices (e.g., smart phones, laptop computers, tablet devices, desktop computers, gaming systems, etc.), a combination of a finger-mounted device 102, 202 and a wearable computing device 104, 204 and/or a combination of a finger-mounted device 102, 202 and one or more other devices.

A device (e.g., a finger-mounted device 102, 202, a wearable computing device 104, 204 and/or another device) may obtain 402 an acceleration signal and a rotation signal from a finger-mounted device 102, 202. This may be accomplished as described in connection with one or more of FIGS. 1-4. For example, a device may read signals from an accelerometer and gyro sensor. Before pre-processing, the acceleration signal(s) and/or rotation signal(s) may be raw signals.

As described above, raw signals from the accelerometer(s) and/or gyro sensor(s) may be pre-processed before performing further movement determination. The pre-processing may include offset correction, high pass filtering, interpolation, moving averaging and/or shimmy removal.

The device may perform 504 offset correction using rest data collected from a calibration process. For example, the device may shift one or more acceleration signal(s) and/or rotation signal(s) to reduce and/or remove an offset indicated during calibration.

The device may high-pass filter 506 one or more acceleration signal(s) and/or rotation signal(s) to remove a direct current (DC) component of the signal(s). For example, the device may filter out low and/or 0 frequency component(s) of the signal(s).

The device may take 508 a period (e.g., last minute or other time length) of data (e.g., of the one or more acceleration signal(s) and/or rotation signal(s)) for movement determination. For example, the device may separate and/or buffer a period of data from the signal(s) for movement determination.

The device may interpolate 510 one or more acceleration signal(s) and/or rotation signal(s). For example, the device may interpolate a signal between data points.

The device may filter 512 (with a moving average filter, for example) one or more acceleration signal(s) and/or rotation signal(s) to remove noise. For example, the device may run the period of data of each signal through a moving average filter to reduce and/or remove noise in the signal(s).

The device may remove 514 shimmy in one or more acceleration signal(s) and/or rotation signal(s). For example, the device may reduce and/or remove shimmy in one or more acceleration signal(s) and/or rotation signal(s) indicated by the calibration.

The device may perform 516 peak detection-based movement determination. In some configurations, the peak detection-based movement determination may take the pre-processed signal(s) and further process them to retrieve the movement information. This may be accomplished as described in connection with one or more of FIGS. 1-4. For example, the device may perform one or more of the procedures described in connection with FIG. 4 to determine input movement.

Figure 6:
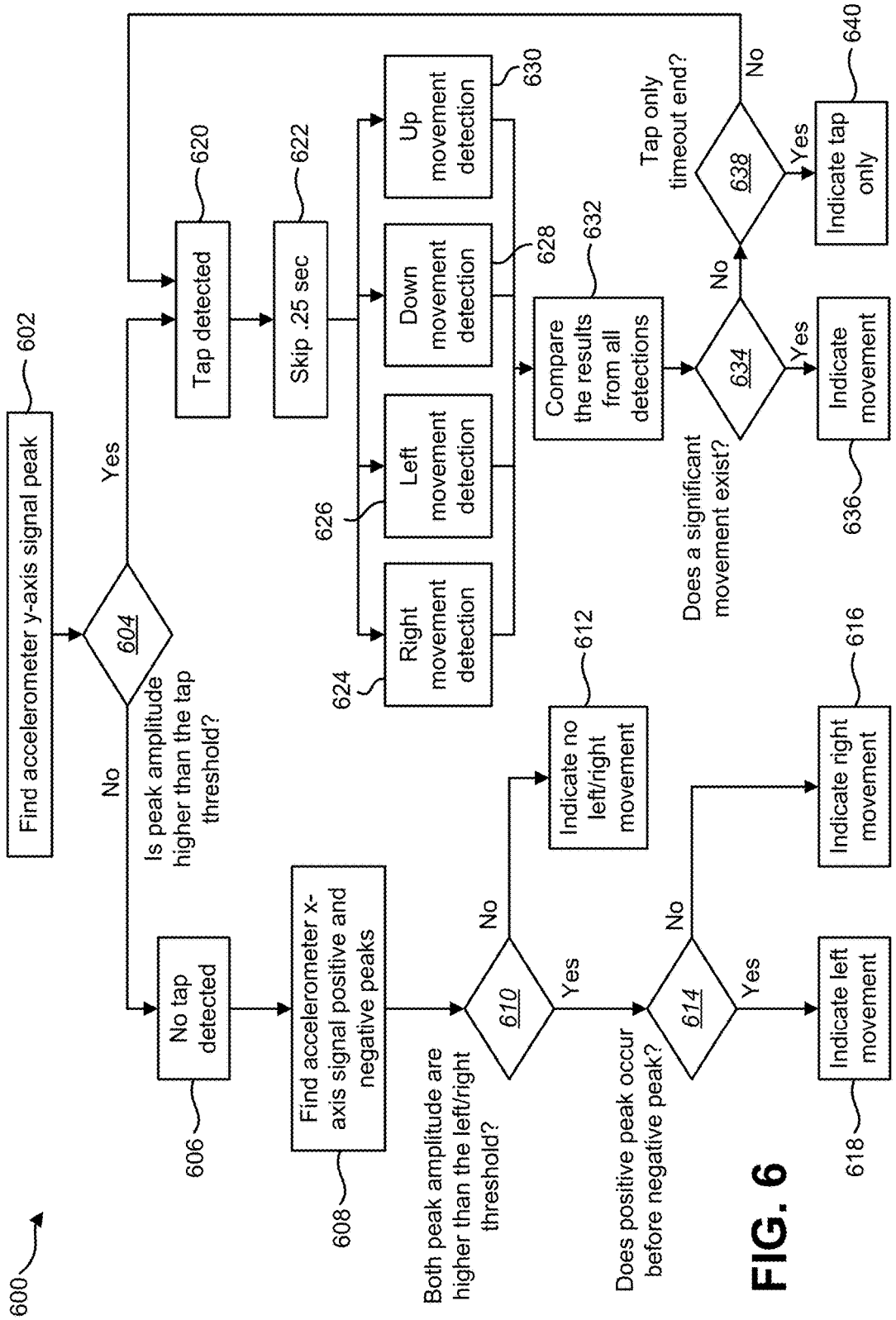
FIG. 6 is a flow diagram illustrating one configuration of a method for peak-based input movement determination.

FIG. 6 is a flow diagram illustrating one configuration of a method 600 for peak-based input movement determination. In some configurations, the method 600 may be a more specific example of one or more procedures (e.g., steps 406, 408, 410, 412, 426, 428 and/or 430, etc.) described in connection with FIG. 4. In particular, FIG. 6 may illustrate a more specific implementation of peak-based movement determination.

The method 600 may be performed by a finger mounted device 102, 202, by a wearable computing device 104, by one or more other devices (e.g., smart phones, laptop computers, tablet devices, desktop computers, gaming systems, etc.), a combination of a finger-mounted device 102, 202 and a wearable computing device 104, 204 and/or a combination of a finger-mounted device 102, 202 and one or more other devices.

A device (e.g., a finger-mounted device 102, 202, a wearable computing device 104, 204 and/or another device) may find 602 an accelerometer Y-axis signal peak. For example, the device may find a maximum value in an acceleration signal region.

The device may determine 604 whether the Y-axis acceleration signal peak amplitude is greater than a tap threshold. If the Y-axis acceleration signal peak amplitude is not greater than the tap threshold, then no tap may be detected 606, and the device may find 608 one or more accelerometer X-axis signal positive and negative peaks. For example, the device may find a maximum value and/or a minimum value in one or more X-axis acceleration signal regions.

The device may determine 610 whether an X-axis acceleration signal positive peak is beyond (e.g., greater than) a sideways movement threshold (e.g., left/right threshold, positive peak threshold, etc.) and/or whether an X-axis acceleration signal negative peak is beyond (e.g., less than) a sideways movement threshold (e.g., left/right threshold, negative peak threshold, etc.). In some configurations, the same sideways movement threshold may be utilized for both peaks. For example, the negative peak may be inverted for comparison with the threshold. In other configurations, separate sideways movement thresholds (e.g., positive and negative threshold) may be respectively utilized for the positive peak and negative peak.

If the X-axis acceleration signal positive peak amplitude and/or the X-axis acceleration signal negative peak amplitude are not beyond the sideways movement threshold(s), the device may indicate 612 no sideways (e.g., left/right) movement (with an explicit or implicit indicator, for example). If the X-axis acceleration signal positive peak amplitude and the X-axis acceleration signal negative peak amplitude are beyond the sideways movement threshold(s), the device may determine 614 whether the X-axis acceleration signal positive peak occurs before the X-axis acceleration signal negative peak.

If the X-axis acceleration signal positive peak occurs before the X-axis acceleration signal negative peak, the device may indicate 618 left movement. If the X-axis acceleration signal positive peak does not occur before the X-axis acceleration signal negative peak, the device may indicate 616 right movement.

If the Y-axis acceleration signal peak amplitude is greater than the tap threshold, the device may determine that a tap is detected 620. The device may skip 622 a period (e.g., 0.25 seconds or another period). For example, the device may skip ahead by the period for analyzing and/or performing detection after the period.

The device may perform 624 right movement detection, may perform 626 left movement detection, may perform 628 down movement detection and/or may perform 630 up movement detection. For example, the device may compare one or more peaks with one or more thresholds, may determine how much larger a peak is beyond a threshold and/or may determine an order of peaks in one or more acceleration and/or rotation signals. The device may compare 632 the results from each kind of detection. One example of combined tap-up movement detection is given in connection with FIG. 7.

The device may determine 634 whether a significant movement exists. If a significant movement exists, the device may indicate 636 movement. For example, the device may indicate a combination movement of a tap and a directional movement (e.g., tap-up, tap-down, tap-left, tap-right, etc.).

If a significant movement does not exist, the device may determine 638 whether a tap only timeout has ended. If the tap only timeout has not ended, the device may return to repeat one or more steps (e.g., skip 622 a period, perform detection, etc.). If the tap only timeout has ended, the device may indicate 640 a tap only.

Figure 7:
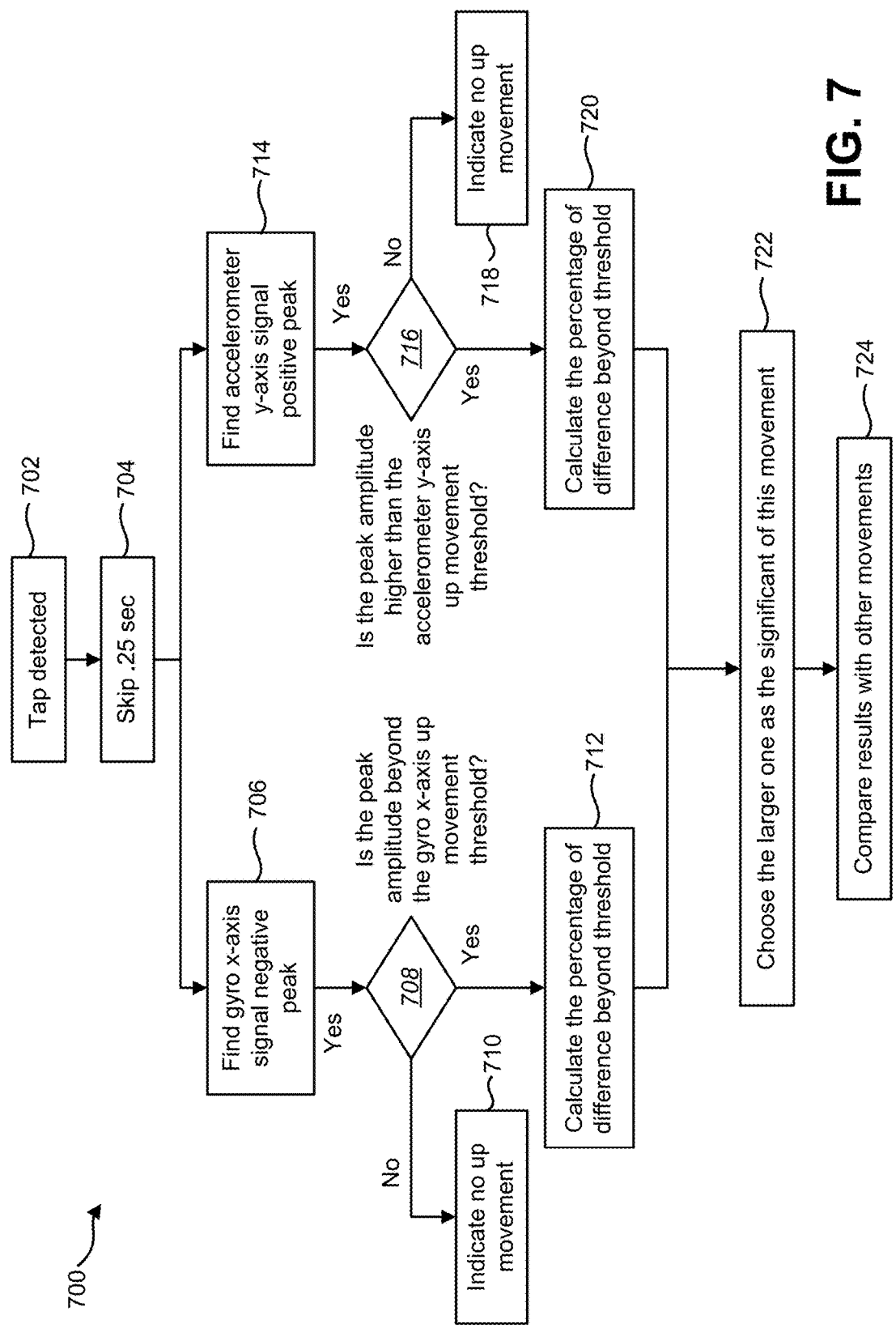
FIG. 7 is a flow diagram illustrating one configuration of a method for tap-up movement determination.

FIG. 7 is a flow diagram illustrating one configuration of a method 700 for tap-up movement determination. In some configurations, the method 700 may be a more specific example of one or more procedures (e.g., steps 602, 622, 630, 632 and/or 634, etc.) described in connection with FIG. 6. In particular, FIG. 7 may illustrate a more specific implementation of up movement (e.g., tap-up movement) determination.

The method 700 may be performed by a finger mounted device 102, 202, by a wearable computing device 104, by one or more other devices (e.g., smart phones, laptop computers, tablet devices, desktop computers, gaming systems, etc.), a combination of a finger-mounted device 102, 202 and a wearable computing device 104, 204 and/or a combination of a finger-mounted device 102, 202 and one or more other devices. If a tap is detected 702, the device may skip 704 a period (e.g., 0.25 seconds or another period). For example, the device may skip ahead by the period for analyzing and/or performing detection after the period.

The device may find 706 a rotation X-axis signal negative peak amplitude. For example, the device may find a minimum value in a rotation signal region.

The device may determine 708 whether the rotation X-axis signal negative peak amplitude is beyond a rotation X-axis signal up movement threshold. If the rotation X-axis signal negative peak amplitude is not beyond (e.g., greater than the threshold or less than the threshold, depending on the configuration) the rotation X-axis signal up movement threshold, the device may indicate 710 no up movement (e.g., tap only). If the rotation X-axis signal negative peak amplitude is beyond the rotation X-axis signal up movement threshold, the device may calculate 712 a percentage of the difference beyond (e.g., over, past, etc.) the threshold.

The device may find 714 an acceleration Y-axis signal positive peak amplitude. For example, the device may find a maximum value in an acceleration signal region.

The device may determine 716 whether the acceleration Y-axis signal positive peak amplitude is beyond an acceleration Y-axis signal up movement threshold. If the acceleration Y-axis signal positive peak amplitude is not beyond (e.g., less than the threshold) the acceleration Y-axis signal up movement threshold, the device may indicate 718 no up movement (e.g., tap only). If the acceleration Y-axis signal positive peak is beyond the acceleration Y-axis signal up movement threshold, the device may calculate 720 a percentage of the difference beyond (e.g., over, past, etc.) the threshold.

The device may choose 722 the large percentage difference beyond the threshold between the percentage difference corresponding to the rotation X-axis negative peak and the percentage difference corresponding to the acceleration Y-axis positive peak. For example, the larger percentage difference may be chosen as the significant peak or percentage difference for the movement. The device may also compare 724 the results with other movements. This comparison 724 may be performed in order to determine which type of movement (e.g., up, down, left, right, etc.) is selected (e.g., which type of movement is most probable). More specifically, after the up movement is detected, the percentages of differences over respective thresholds are calculated 712, 720, and the larger one may be chosen 722 as the significant value for this movement. Since there might be cases where more than one movement is detected, all the significant values from all movements may be compared 724 to decide which movement is the dominant one. Similar procedures may be implemented in the tap-down, tap-left, and tap-right movement detection.

As can be observed, some configurations of the systems and methods disclosed herein may provide simple and practical algorithms to determine movement with a finger-mounted device equipped with an accelerometer and gyro sensor. The determined movement may be utilized for text entry on a virtual keyboard/keypad in some implementations. The systems and methods disclosed herein may utilize easily detected acceleration and rotation signal peak features, such as amplitude, positive/negative peaks, order of peaks and/or time interval(s) between peaks to determine movements. The systems and methods may detect finger movements (e.g., tap, left, right, up, down, etc.), a combination of movements (e.g., tap-up, tap-down, tap-left, tap-right, etc.), but may not be limited to those movements in some configurations. The systems and methods disclosed herein may also detect a length of a movement. One benefit of the systems and methods disclosed herein is a smaller processing power requirement, due to the simplicity of the algorithms.

FIGS. 8-16 provide examples of signals during some specific finger movements or combination of movements. The movements or combination of movements include a finger tap on a physical surface, a finger tap on a physical surface followed by an additional movement (e.g., up, down, left and right), a short left movement, a short right movement, a long left movement, and a long right movement. The different characteristics of each signal may be extracted and used to detect the intended movement and action. However, the movements are only few examples of movements that may be determined in accordance with the systems and methods disclosed herein. In other words, the systems and methods disclosed herein are not limited to the examples of movement or combination of movements provided in FIGS. 8-16.

Figure 8:
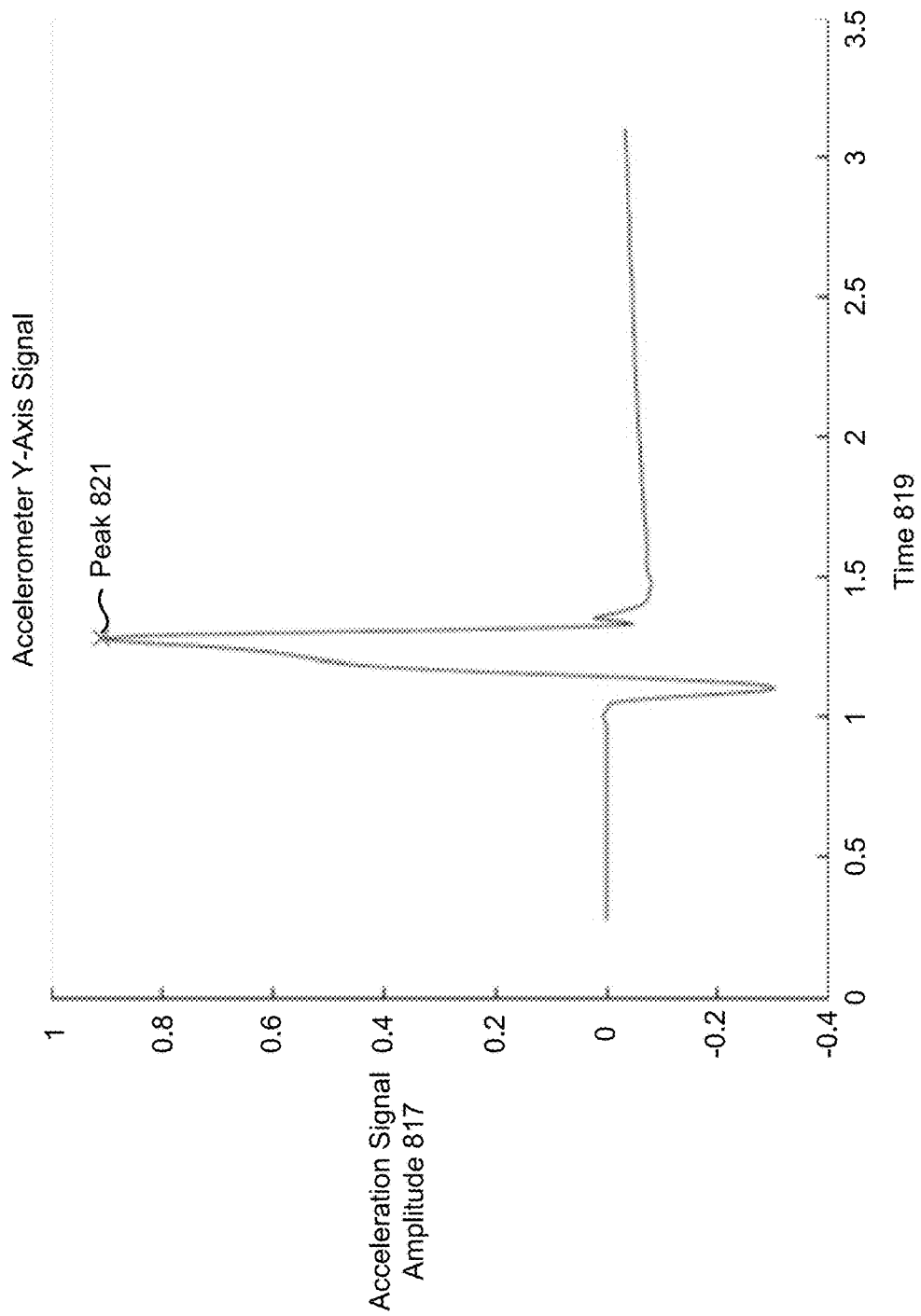
FIG. 8 is a plot illustrating an example of an accelerometer Y-axis signal of a finger tap on a physical surface.

FIG. 8 is a plot illustrating an example of an accelerometer Y-axis signal of a finger tap on a physical surface. The vertical axis of the plot is shown in terms of acceleration signal amplitude 817. It should be noted that signal amplitude may have units of voltage or current in some configurations. The horizontal axis of the plot is shown in terms of time 819 (seconds).

As illustrated in FIG. 8, a finger tap on a physical surface causes a high acceleration signal amplitude (from the accelerometer Y-axis signal). This signal may be utilized to identify a tap action of a finger on a physical surface as described herein. For example, if a peak 821 in the acceleration signal amplitude 817 is beyond (e.g., greater than) a tap threshold, the device may determine that a finger tap has occurred.

Figure 9:
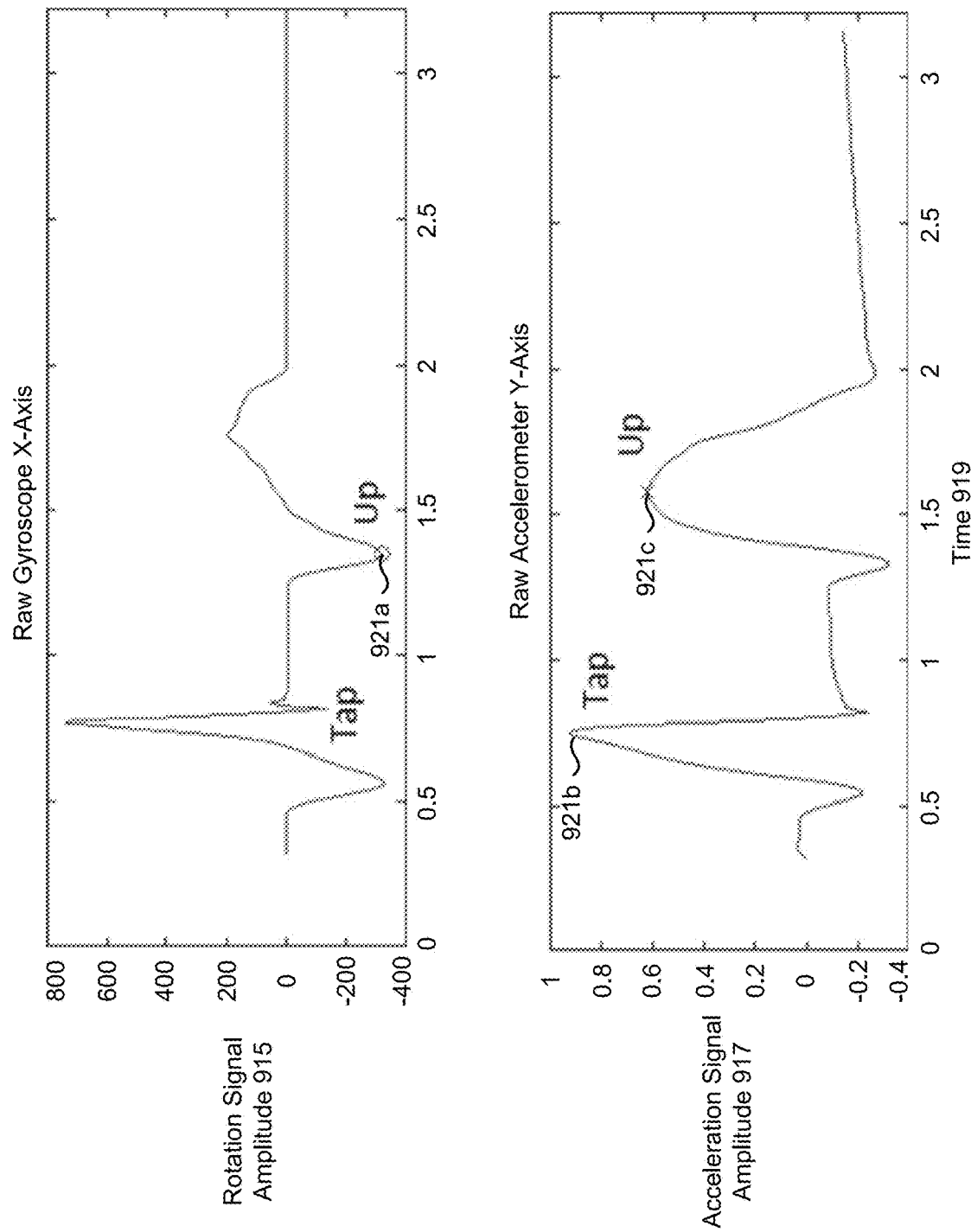
FIG. 9 illustrates plots that show examples of a raw gyroscope X-axis signal and a raw accelerometer Y-axis signal of a combined tap-up movement.

FIG. 9 illustrates plots that show examples of a raw gyroscope X-axis signal and a raw accelerometer Y-axis signal of a combined tap-up movement. The vertical axes of the plots are shown in terms of a rotation signal amplitude 915 and an acceleration signal amplitude 917. It should be noted that signal amplitudes may have units of voltage or current in some configurations. The horizontal axes of the plots are shown in terms of time 919 (seconds).

As illustrated in FIG. 9, the plots show the gyro X-axis and accelerometer Y-axis signals of a combined tap-up movement. The tap-up movement means that the finger taps on a physical surface, and is then followed by an up movement. The tap on the physical surface has the similar feature as described in FIG. 8 (as illustrated by the peak 921b, for example). The up movement of the finger causes a negative peak 921a of the gyro X-axis signal, as indicated in the upper graph. On the accelerometer Y-axis, the up movement causes a positive peak 921c as indicated by the lower graph. These signals may be utilized to identify a tap-up action of a finger on a physical surface as described herein. For example, if a peak 921b in the acceleration signal amplitude 917 is beyond (e.g., greater than) a tap threshold, and is followed by a negative peak 921a in the rotation signal amplitude 915 (that is less than a threshold, for example) with a positive peak 921c in the acceleration signal amplitude (that is greater than another threshold, for example), the device may determine that a tap-up movement has occurred.

Figure 10:
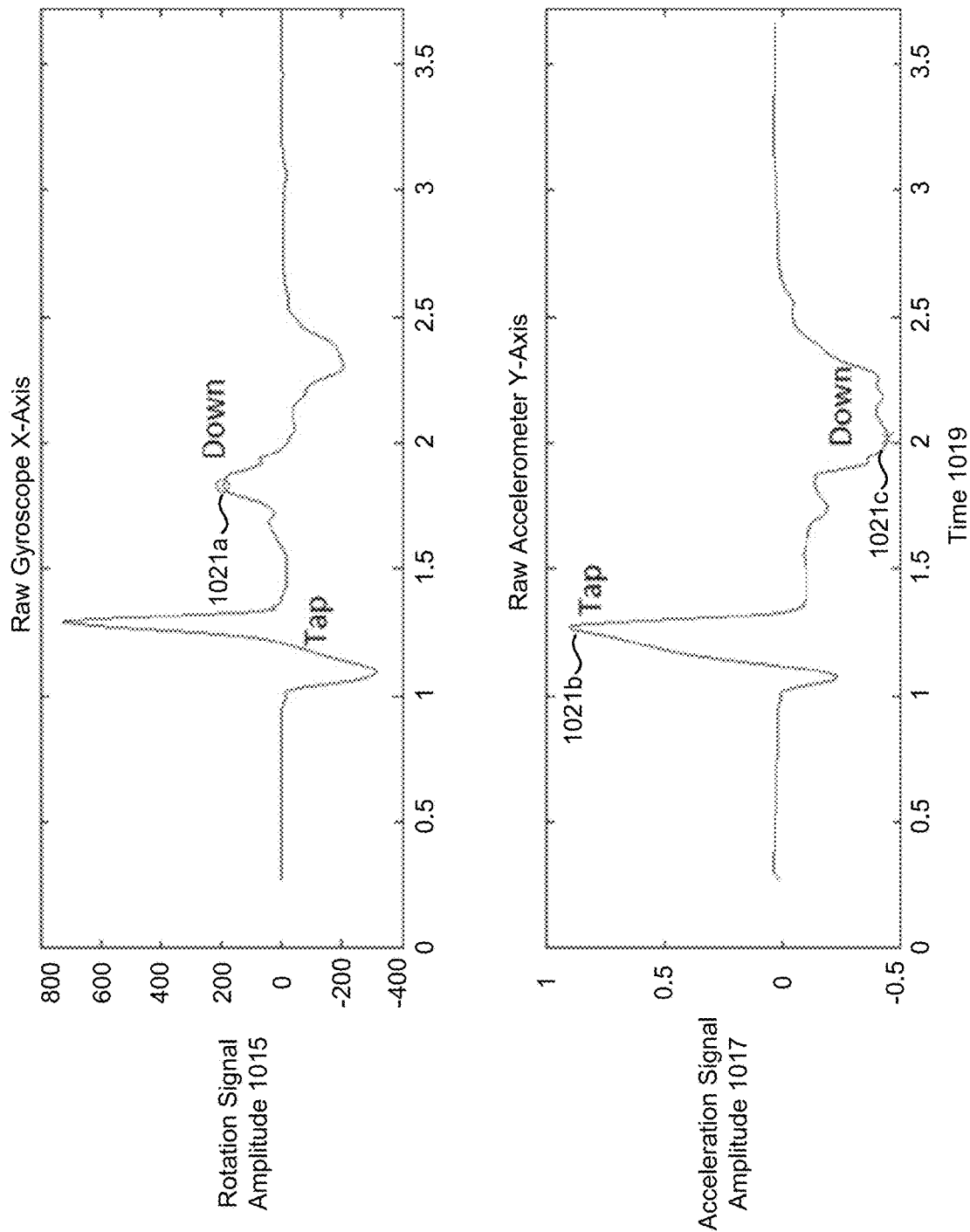
FIG. 10 illustrates plots that show examples of a raw gyroscope X-axis signal and a raw accelerometer Y-axis signal of a combined tap-down movement.

FIG. 10 illustrates plots that show examples of a raw gyroscope X-axis signal and a raw accelerometer Y-axis signal of a combined tap-down movement. The vertical axes of the plots are shown in terms of a rotation signal amplitude 1015 and an acceleration signal amplitude 1017. It should be noted that signal amplitudes may have units of voltage or current in some configurations. The horizontal axes of the plots are shown in terms of time 1019 (seconds).

As illustrated in FIG. 10, the plots show the gyro X-axis and accelerometer Y-axis signals of a combined tap-down movement. The tap-down movement means that the finger taps on a physical surface, and is then followed by a down movement. The tap on the physical surface has the similar feature as described in FIG. 8 (as illustrated by the peak 1021b, for example). The down movement of the finger causes a positive peak 1021a of the gyro X-axis signal, as indicated in the upper graph. On the accelerometer Y-axis, the down movement causes a negative peak 1021c as indicated by the lower graph. These signals may be utilized to identify a tap-down action of a finger on a physical surface as described herein. For example, if a peak 1021b in the acceleration signal amplitude 1017 is beyond (e.g., greater than) a tap threshold, and is followed by a positive peak 1021a in the rotation signal amplitude 1015 (that is greater than a threshold, for example) with a negative peak 1021c in the acceleration signal amplitude (that is less than another threshold, for example), the device may determine that a tap-down movement has occurred.

Figure 11:
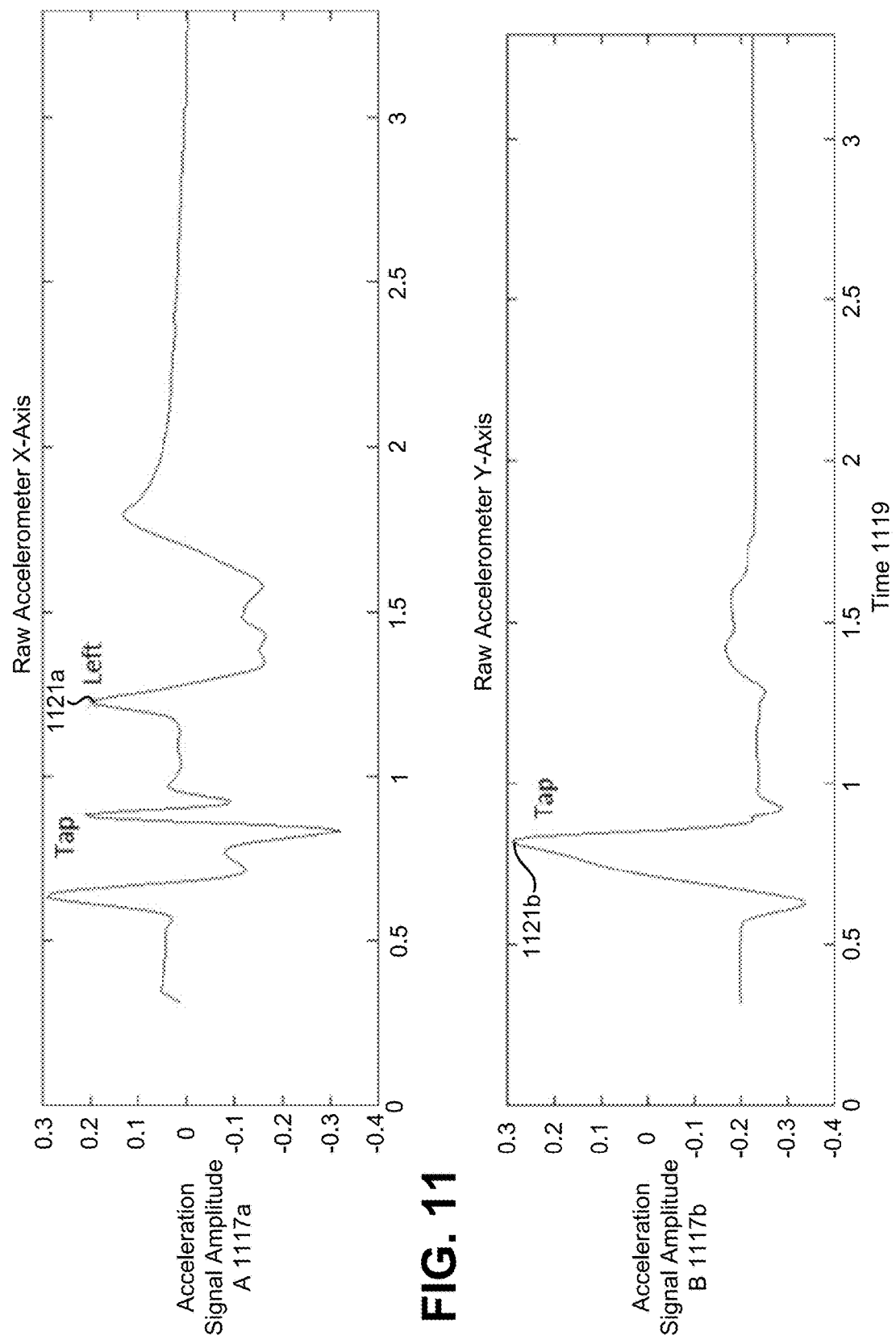
FIG. 11 illustrates plots that show examples of a raw accelerometer X-axis signal and a raw accelerometer Y-axis signal of a combined tap-left movement.

FIG. 11 illustrates plots that show examples of a raw accelerometer X-axis signal and a raw accelerometer Y-axis signal of a combined tap-left movement. The vertical axes of the plots are shown in terms of acceleration signal amplitude A 1117a and acceleration signal amplitude B 1117b. It should be noted that signal amplitudes may have units of voltage or current in some configurations. The horizontal axes of the plots are shown in terms of time 1119 (seconds).

As illustrated in FIG. 11, the plot shows the accelerometer X-axis of a combined tap-left movement. The tap-left movement means that the finger taps on a physical surface, and is then followed by a left movement. The tap on the physical surface has the similar feature as described in FIG. 8 (as illustrated by the peak 1121b, for example). The left movement of the finger causes a positive peak 1121a of the accelerometer X-axis signal, as indicated in the upper graph. These signals may be utilized to identify a tap-left action of a finger on a physical surface as described herein. For example, if a peak 1121b in acceleration signal amplitude B 1117b is beyond (e.g., greater than) a tap threshold, and is followed by a positive peak 1121a in acceleration signal amplitude A 1117a (that is greater than a threshold, for example), the device may determine that a tap-left movement has occurred.

Figure 12:
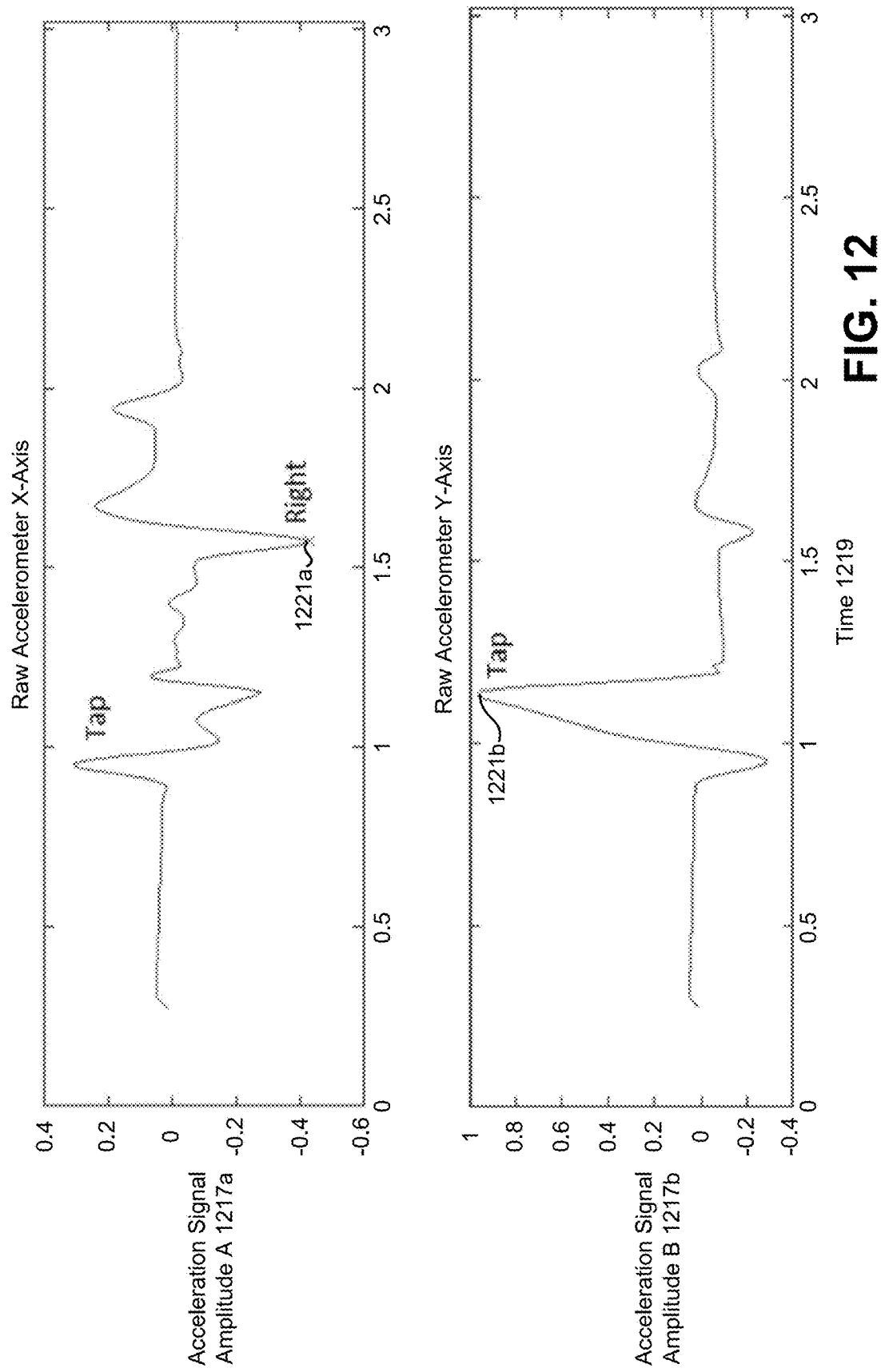
FIG. 12 illustrates plots that show examples of a raw accelerometer X-axis signal and a raw accelerometer Y-axis signal of a combined tap-right movement.

FIG. 12 illustrates plots that show examples of a raw accelerometer X-axis signal and a raw accelerometer Y-axis signal of a combined tap-right movement. The vertical axes of the plots are shown in terms of acceleration signal amplitude A 1217a and acceleration signal amplitude B 1217b. It should be noted that signal amplitudes may have units of voltage or current in some configurations. The horizontal axes of the plots are shown in terms of time 1219 (seconds).

As illustrated in FIG. 12, the plot shows the accelerometer X-axis of a combined tap-right movement. The tap-right movement means that the finger taps on a physical surface, and is then followed by a right movement. The tap on the physical surface has the similar feature as described in FIG. 8 (as illustrated by the peak 1221b, for example). The tap of the finger causes a positive peak 1221b of the accelerometer Y-axis signal, as indicated in the lower graph. On the accelerometer X-axis signal, the right movement causes a negative peak 1221a as indicated by the upper graph. These signals may be utilized to identify a tap-right action of a finger on a physical surface as described herein. For example, if a peak 1221b in acceleration signal amplitude B 1217b is beyond (e.g., greater than) a tap threshold, and is followed by a negative peak 1221a in acceleration signal amplitude A 1217a (that is less than a threshold, for example), the device may determine that a tap-right movement has occurred.

Figure 13:
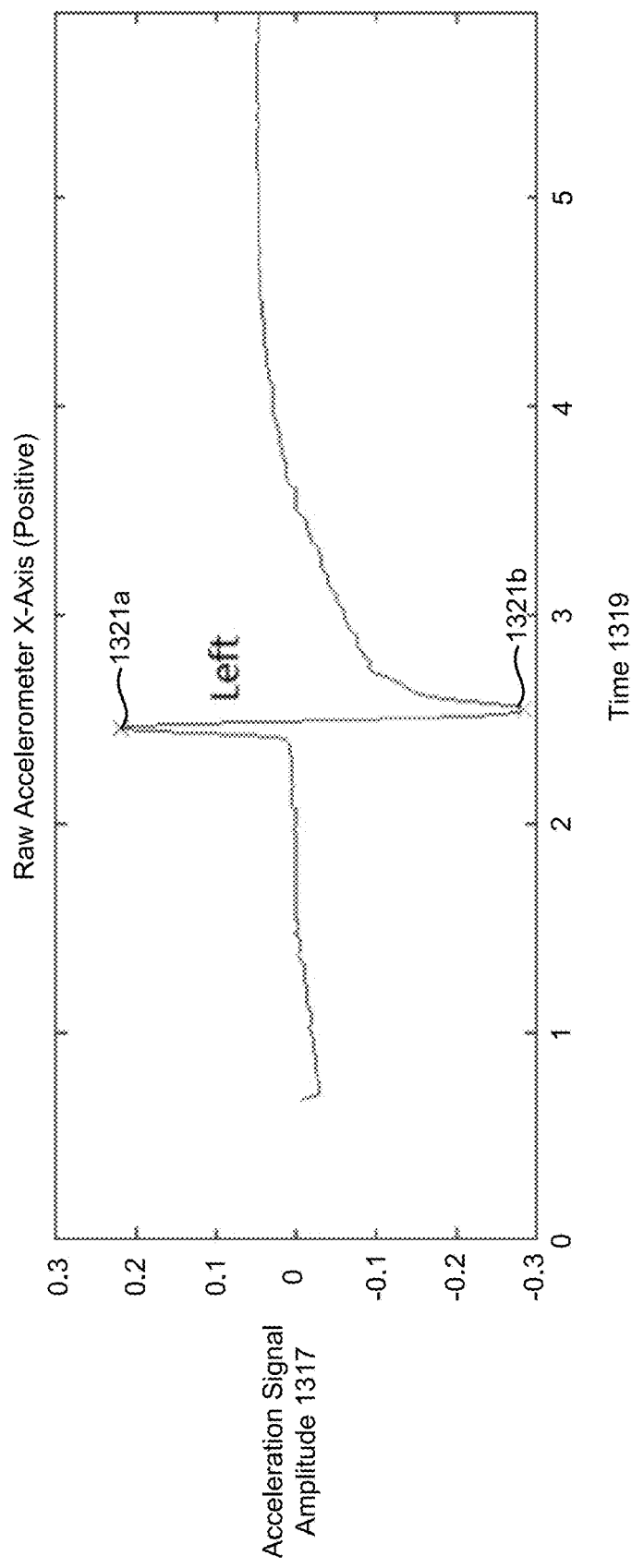
FIG. 13 illustrates a plot of an example of a raw accelerometer X-axis signal of a short left movement along the +X direction.

FIG. 13 illustrates a plot of an example of a raw accelerometer X-axis signal of a short left movement along the +X direction. The vertical axis of the plot is shown in terms of an acceleration signal amplitude 1317. It should be noted that signal amplitudes may have units of voltage or current in some configurations. The horizontal axis of the plot is shown in terms of time 1319 (seconds).

As illustrated in FIG. 13, the plot shows the accelerometer X-axis of a short left movement. The short left movement means that the finger moves toward the left, which is the positive X direction, for a relatively short distance. Since the move is toward the positive direction, the accelerometer X-axis shows a positive peak 1321a followed by a negative peak 1321b as illustrated in the plot. For example, if a positive peak 1321a (e.g., a positive peak that is greater than a threshold) in the acceleration signal amplitude 1317 is followed by a negative peak 1321b (e.g., a negative peak that is less than a threshold) within a time threshold, the device may determine that a short left movement has occurred.

Figure 14:
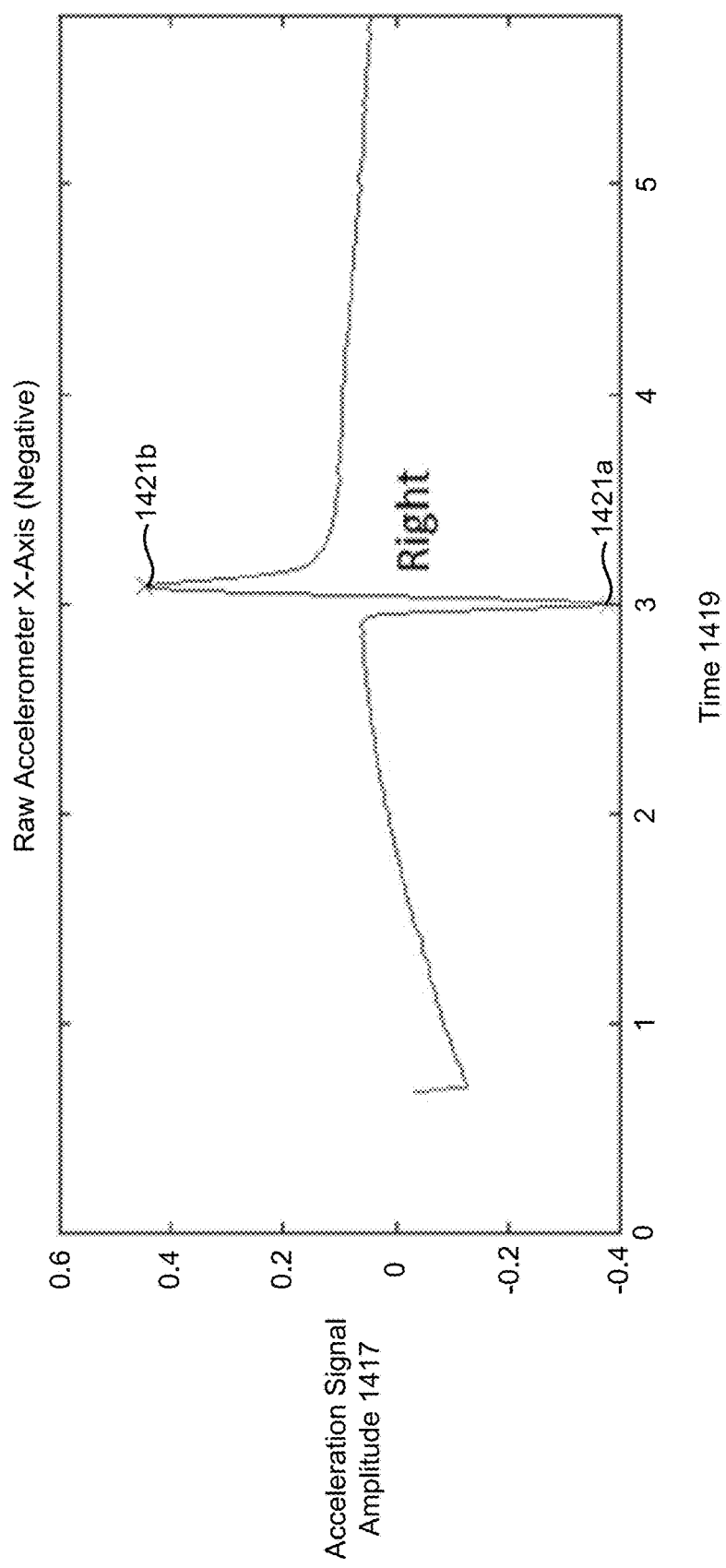
FIG. 14 illustrates a plot of an example of a raw accelerometer X-axis signal of a short right movement along the −X direction.

FIG. 14 illustrates a plot of an example of a raw accelerometer X-axis signal of a short right movement along the −X direction. The vertical axis of the plot is shown in terms of an acceleration signal amplitude 1417. It should be noted that signal amplitudes may have units of voltage or current in some configurations. The horizontal axis of the plot is shown in terms of time 1419 (seconds).

As illustrated in FIG. 14, the plot shows the accelerometer X-axis of a short right movement. The short right movement means that the finger moves toward the right, which is the negative X direction, for a relatively short distance. Since the move is toward the negative direction, the accelerometer X-axis shows a negative peak 1421a followed by a positive peak 1421b as illustrated in the plot. For example, if a negative peak 1421a (e.g., a negative peak that is less than a threshold) in the acceleration signal amplitude 1417 is followed by a positive peak 1421b (e.g., a positive peak that is greater than a threshold) within a time threshold, the device may determine that a short right movement has occurred.

Figure 15:
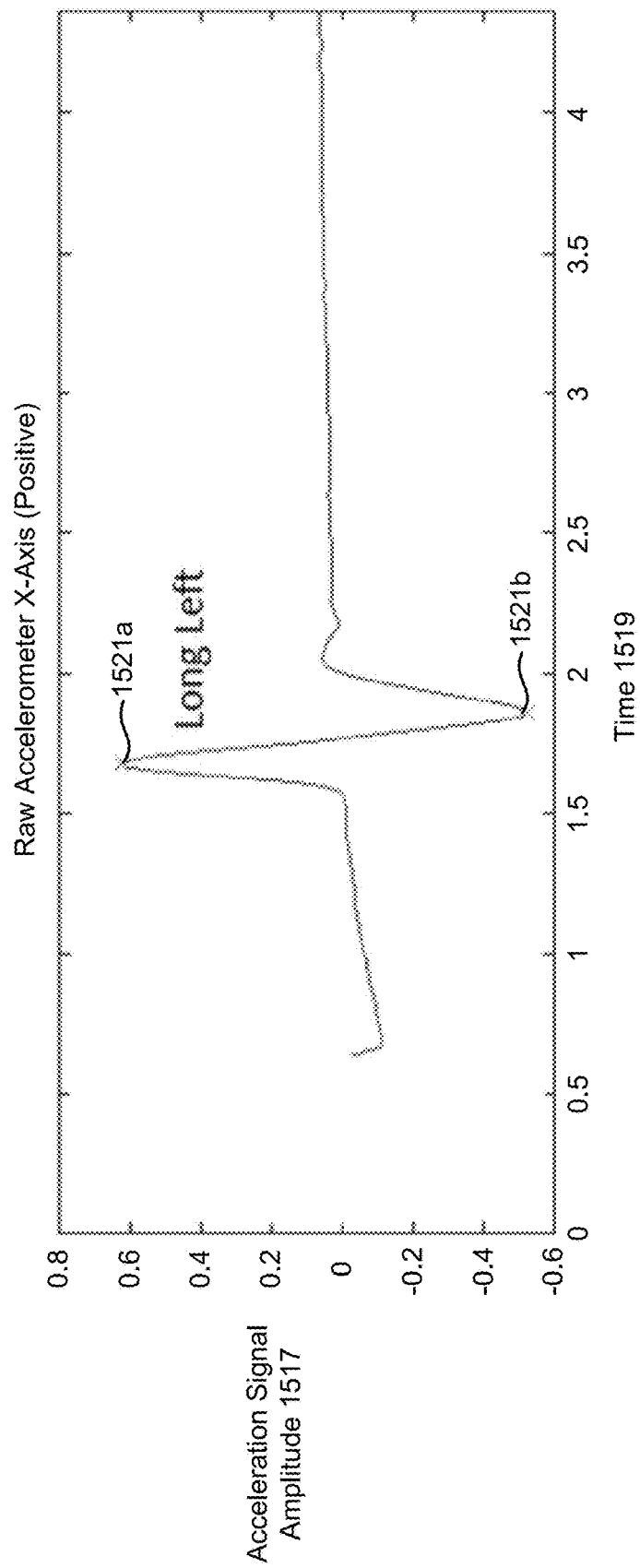
FIG. 15 illustrates a plot of an example of a raw accelerometer X-axis signal of a long left movement along the +X direction.

FIG. 15 illustrates a plot of an example of a raw accelerometer X-axis signal of a long left movement along the +X direction. The vertical axis of the plot is shown in terms of an acceleration signal amplitude 1517. It should be noted that signal amplitudes may have units of voltage or current in some configurations. The horizontal axis of the plot is shown in terms of time 1519 (seconds).

As illustrated in FIG. 15, the plot shows the accelerometer X-axis of a long left movement. The long left movement means that the finger moves toward the left, which is the positive X direction, for a relatively long distance. Since the move is toward the positive direction, the accelerometer X-axis shows a positive peak 1521a followed by a negative peak 1521b as illustrated in the plot. Compared with the short left movement shown in the FIG. 13, the width of positive and negative wave are wider, and the distance between two peaks 1521a-b is larger. For example, if a positive peak 1521a (e.g., a positive peak that is greater than a threshold) in the acceleration signal amplitude 1517 is followed by a negative peak 1521b (e.g., a negative peak that is less than a threshold) beyond a time threshold, the device may determine that a long left movement has occurred.

Figure 16:
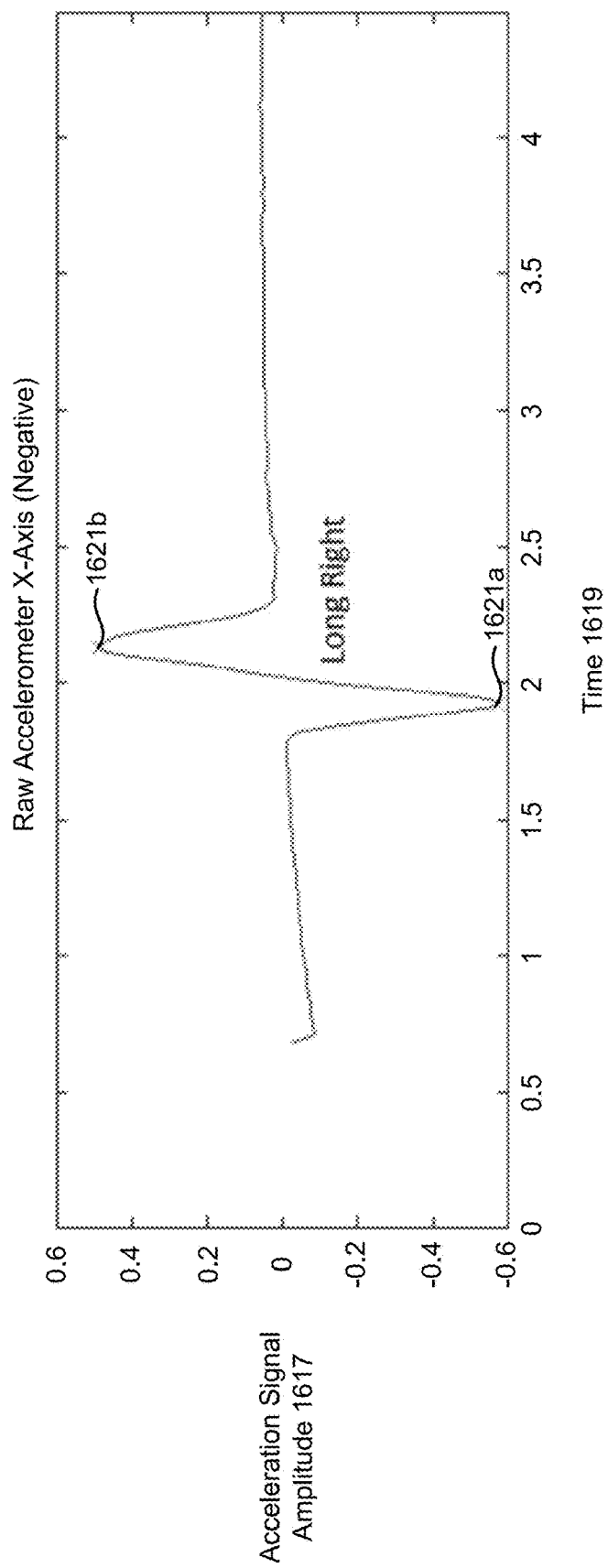
FIG. 16 illustrates a plot of an example of a raw accelerometer X-axis signal of a long right movement along the −X direction.

FIG. 16 illustrates a plot of an example of a raw accelerometer X-axis signal of a long right movement along the −X direction. The vertical axis of the plot is shown in terms of an acceleration signal amplitude 1617. It should be noted that signal amplitudes may have units of voltage or current in some configurations. The horizontal axis of the plot is shown in terms of time 1619 (seconds).

As illustrated in FIG. 16, the plot shows the accelerometer X-axis of a long right movement. The long right movement means that the finger moves toward the right, which is the negative X direction, for a relatively long distance. Since the move is toward the negative direction, the accelerometer X-axis shows a negative peak 1621a followed by a positive peak 1621b as illustrated in the plot. Compared with the short right movement shown in the FIG. 14, the width of positive and negative wave are wider, and the distance between two peaks 1621a-b is larger. For example, if a negative peak 1621a (e.g., a negative peak that is less than a threshold) in the acceleration signal amplitude 1617 is followed by a positive peak 1621b (e.g., a positive peak that is greater than a threshold) beyond a time threshold, the device may determine that a long right movement has occurred.

The description in connection with FIGS. 1-16 illustrate that the systems and methods disclosed herein may provide an approach that is simple but sufficient to detect pre-defined finger movements. As a result, some configurations of the systems and methods may simplify movement determination and/or detection and may improve accuracy by not heavily relying on the overall shape of the curve as the double integration approach does. For example, some configurations of the systems and methods disclosed herein may process accelerometer and gyro signals by extracting peak and/or amplitude related characteristics to further detect the user intended movement and action. For example, the systems and methods disclosed herein may be completely or partially implemented in a device equipped with accelerometer and gyro sensor, such as the finger-mounted device. In some configurations, the determined input movement (e.g., detected finger movement) may be utilized to select and/or hit the keys on a virtual keyboard/keypad to enter text as further described in connection with FIGS. 17-19.

Figure 17:
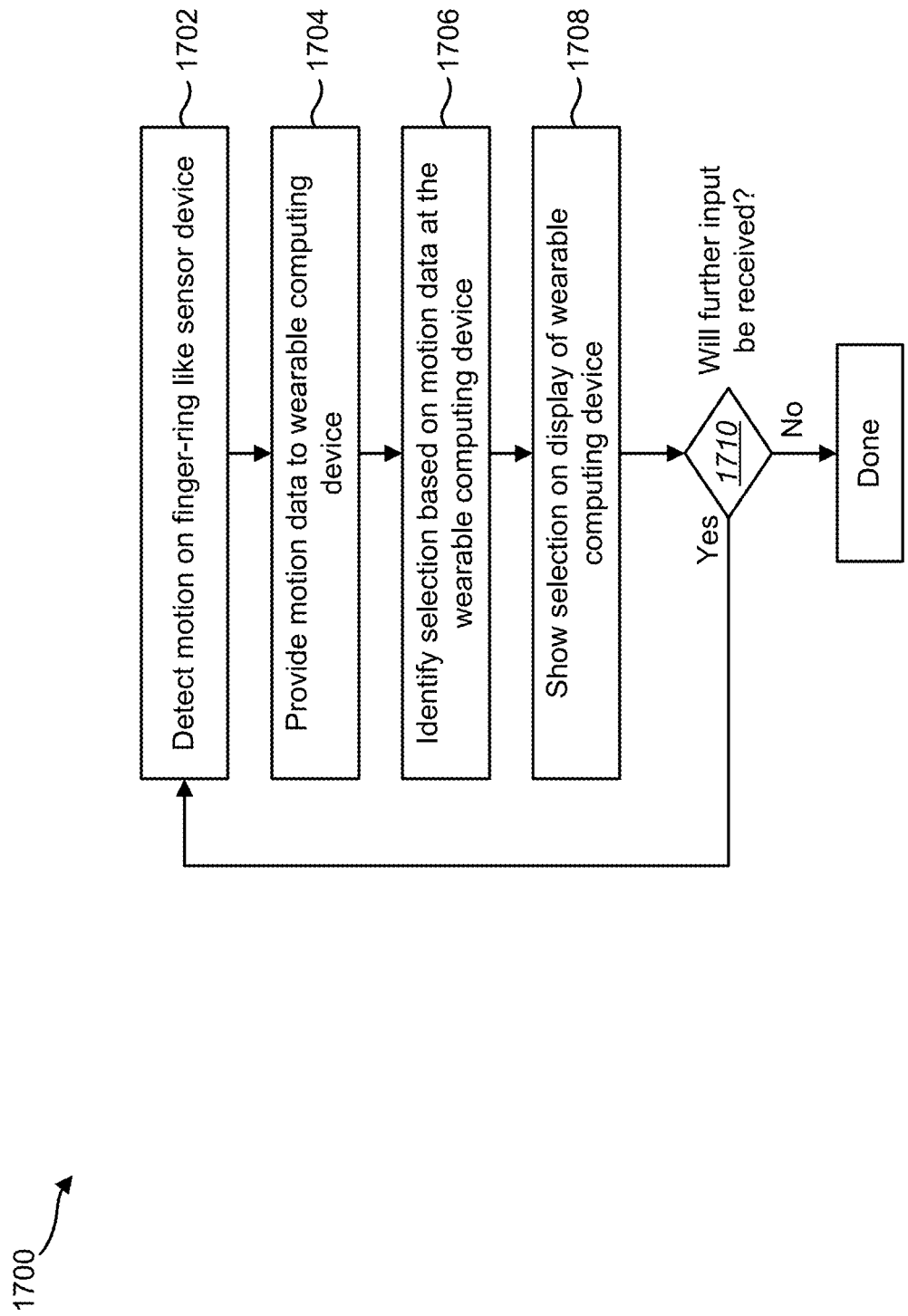
FIG. 17 is a flow diagram illustrating one configuration of a method for entering text on a wearable computing device.

FIG. 17 is a flow diagram illustrating one configuration of a method 1700 for entering text on a wearable computing device 204. A finger-mounted device 202 may detect 1702 motion. The motion may be detected 1702, for example, by an accelerometer sensor 210 or gyroscope sensor 212. A finger-mounted device 202 may provide 1704 motion data to a wearable computing device 204. The motion data may include data generated by a sensor in the sensor device 202 (e.g., acceleration signal(s) and/or rotation signal(s)). Additionally or alternatively, the motion data may include one or more gestures (e.g., up, down, left, right, diagonal directions, tap, tap-up, tap-down, tap-right, tap-left, short left, long left, short right, long right, short up, long up, short down and/or long down, etc.) The motion data may be wirelessly transmitted to the computing device 204. A selection may then be identified 1706 based on motion data at the wearable computing device 204. The selection may be shown 1708 on the display 220 of the wearable computing device 204. After the selection has been shown 1708 on the display 220, it should be determined 1710 whether further input is to be received at the wearable computing device 204. For example, determining 1710 whether further input is to be received may include determining whether an entire word has been entered, or determining whether the user wishes to continue entering input. If it is determined 1710 that further user input is to be received, the finger-mounted device 202 may return to detecting 1702 motion by the finger-mounted device 202. If it is determined 1710 that no further input is to be received, the input process may be done or complete.

Figure 18:
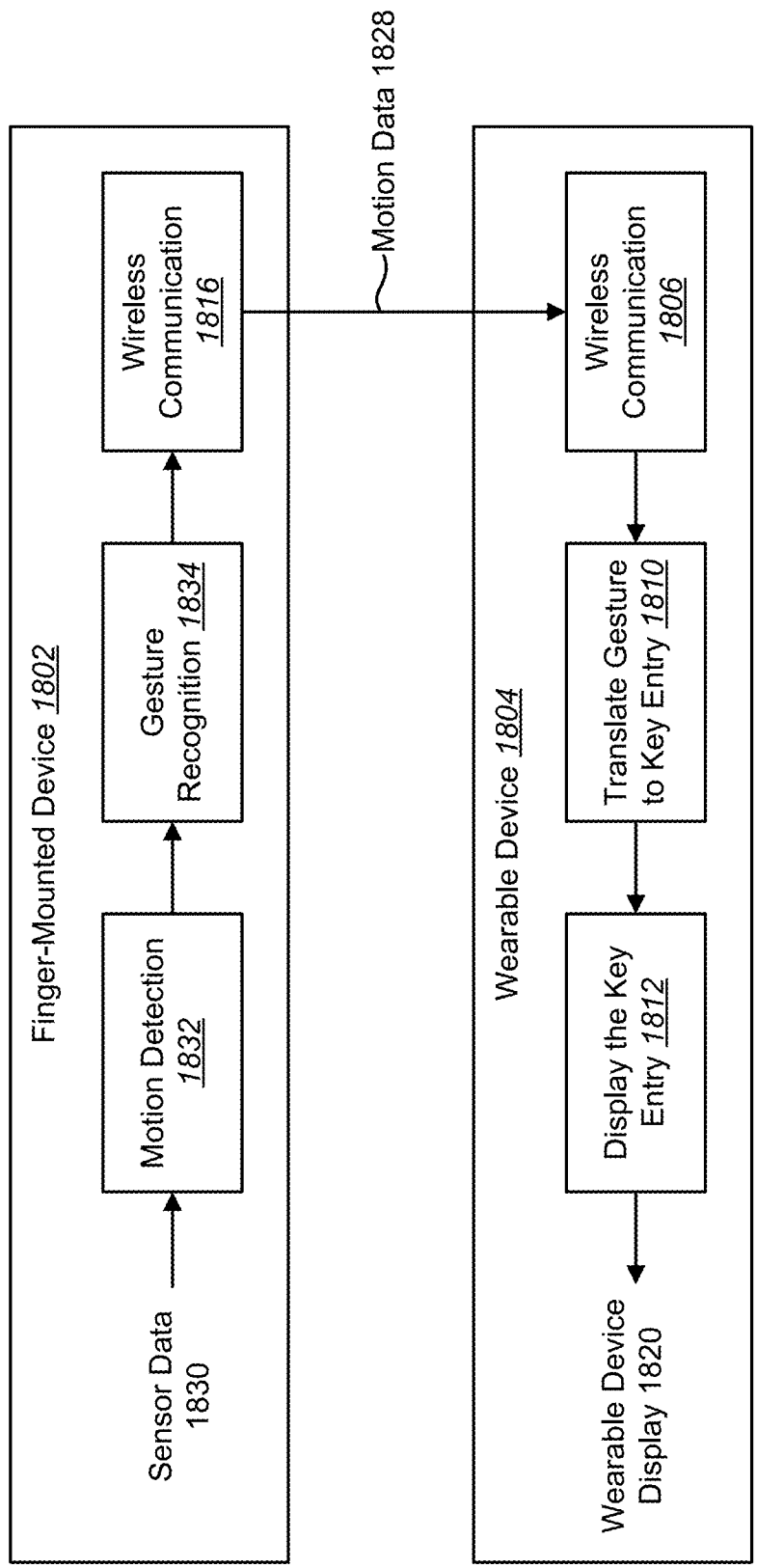
FIG. 18 illustrates one configuration of a high-level process diagram of a finger-mounted device transmitting motion data to a wearable device.

FIG. 18 illustrates one configuration of a high-level process diagram of a finger-mounted device 1802 (e.g., finger-ring like sensor device) transmitting motion data 1828 to a wearable device 1804. The motion detection process 1832 in the finger-mounted device 1802 collects raw sensor data 1830 from the sensors and detects relevant finger motions while eliminating noises and triggers the gesture recognition process 1834. The gesture recognition process 1834 then detects certain designated finger motions, such as tapping on a physical surface and moving (or swiping) toward the left, right, up, down or diagonal, etc. The gesture recognition process 1834 may output a limited number of gestures based on the motion it receives. For example, in one configuration, the gesture recognition process 1834 may output one of the following gestures: Up, Down, Left, Right.

In another configuration, the gesture recognition process 1834 may output one of the following gestures: Up, Up-Left (i.e., diagonally upward and to the left), Left, Down-Left (i.e., diagonally downward and to the left), Down, Down-Right (i.e., diagonally downward and to the right), Right, Up-Right (i.e., diagonally upward and to the right). Other directions may be possible. The gesture output may then be used to select a key on the wearable device 1804. Additionally or alternatively, the gestures may include tap, tap-up, tap-down, tap-right, tap-left, short left, long left, short right, long right, short up, long up, short down, long down, etc. The detected gestures are transmitted to the wearable device 1804 via a wireless communication process 1816 in the form of motion data 1828. The motion data 1828 may include peak information indicating finger movement. For example, it may send X, Y, Z acceleration and/or rotation signals. Alternatively, it may simply send a direction, such as Left, Right, Up or Down, as described above. It should be noted that the systems and methods disclosed herein may not determine an actual distance (in millimeters, centimeters, inches, etc., for example) and/or position in some configurations. For example, peak information may be utilized in order to avoid performing an actual distance calculation (e.g., actual distance calculations may not be performed in some configurations). For example, an actual distance calculation may involve integrating one or more accelerometer signals to obtain one or more velocities, which may be utilized to determine an actual distance and/or may involve integrating the velocity(ies) to determine positions, which may be utilized to determine an actual distance. It should be noted that although an actual distance calculation may not be performed in some configurations, some approaches of the systems and methods disclosed herein may indicate a relative length (e.g., a categorized length such as "short" or "long," for example) of a movement.

By way of example, one possible protocol that may be used is the Bluetooth Serial Port Profile (SPP). Some information, such as Action: tap, may be sent using Bluetooth SPP.

The wearable device 1804 receives the gestures and/or sensor data via motion data 1828 through a wireless communication process 1806. Software running on the wearable device 1804 may take in motion data 1828 and translates 1810 the gestures to the corresponding actions on the virtual keyboard/keypad presented 1812 on the wearable device display 1820.

Figure 19A:
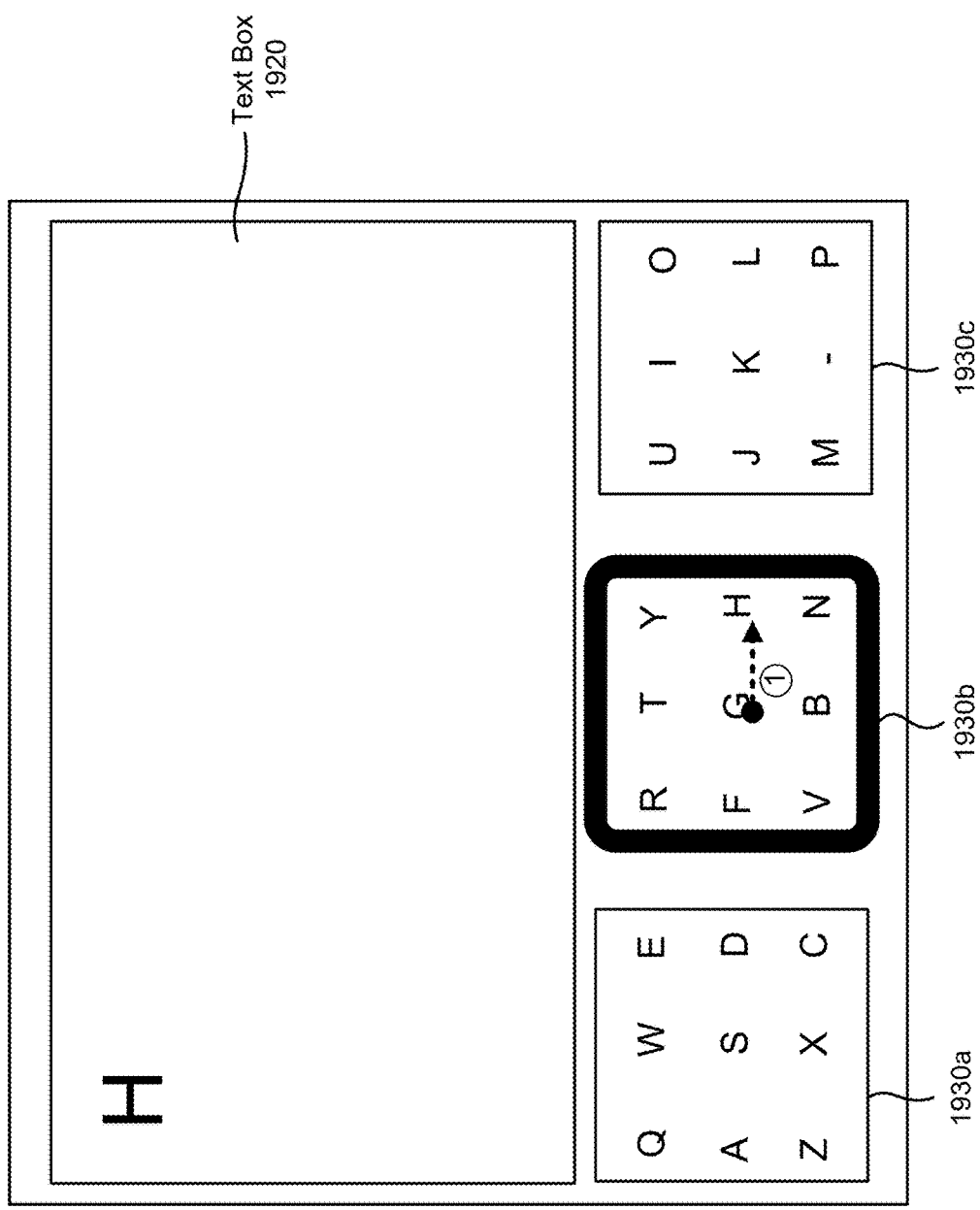
FIG. 19A is a diagram illustrating an example of a step in the process for using a finger-mounted device to enter the word "HELLO" on a wearable device, where the finger-mounted device is in wireless electronic communication with the wearable device.

FIG. 19A is a diagram illustrating an example of a step in the process for using a finger-mounted device 102 to enter the word "HELLO" on a wearable computing device 104, where the finger-mounted device 102 is in wireless electronic communication with the wearable computing device 104. This figure illustrates the display 220 a user would see on the wearable computing device 104. The display 220 may include a smart device virtual keyboard layout that is divided into a plurality of segments. Each segment may correspond to two or more keys of the virtual keyboard. The relative position of the segments may define which gestures can be used to select a particular segment. In the configuration shown in FIGS. 19A-19C, three segments 1930a-c divide the virtual keyboard layout. The three segments 1930a-c are positioned below a text box 1920 where selected text appears.

Figure 19C:
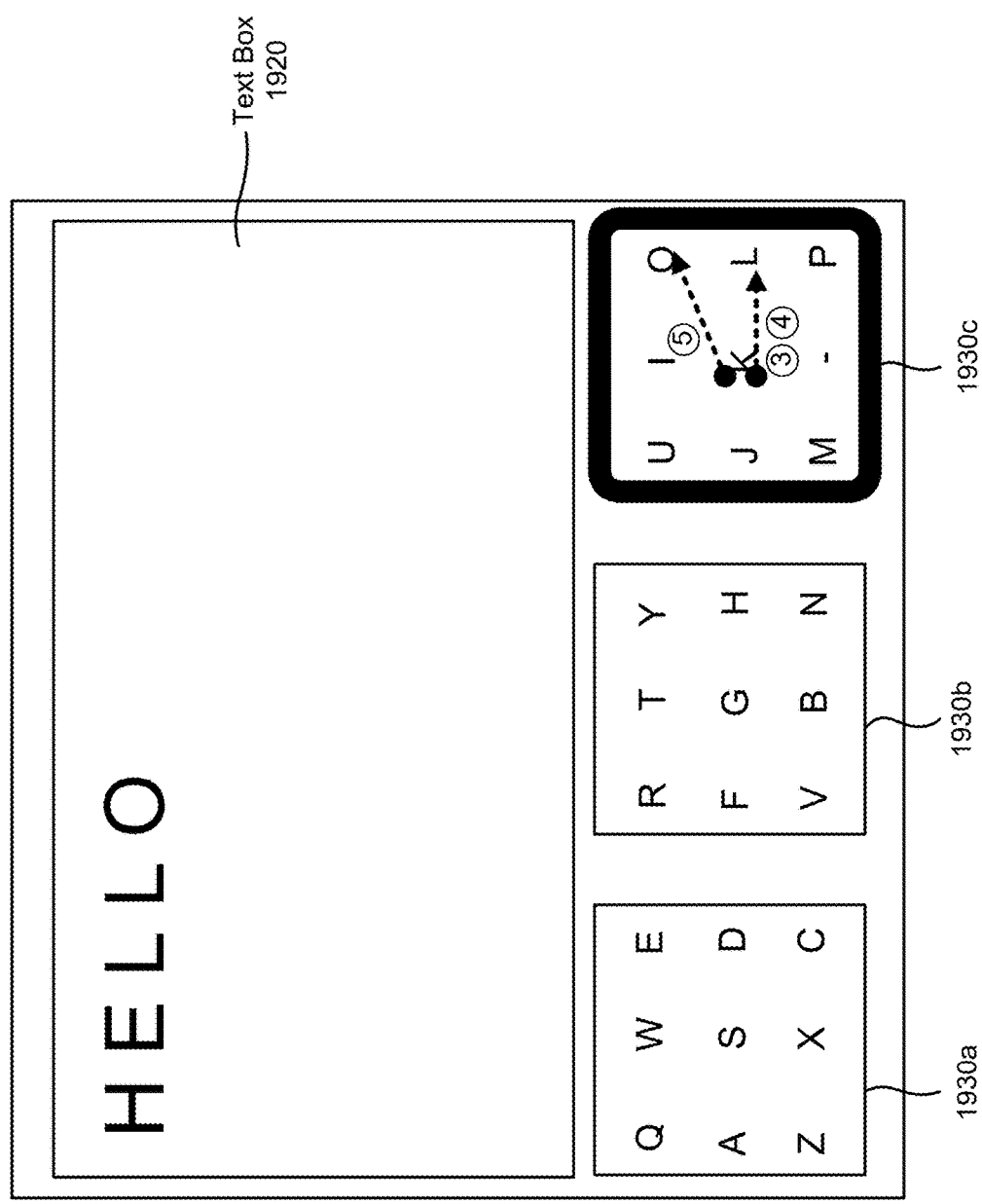
FIG. 19C is a diagram illustrating an example of a step in the process for using a finger-mounted device to enter the word "HELLO" on a wearable device.

Normally, the user would rest his/her wrist on a physical surface such as a table, an arm rest, leg, etc. In the example of FIGS. 19A-C, a user will enter the word "HELLO" on the wearable computing device 104 using the sensor device 102. Initially, the wearable computing device 104 is not in text entry mode and is then placed into text entry mode. When the wearable computing device 104 enters text entry mode, the text box 1920, initially empty, is displayed above the virtual keyboard layout that has been divided into a plurality of segments 1930a-c. As the user moves the sensor device 102, using a finger, horizontally, one of the three keyboard segments 1930a-c, each of which includes designated letters, is highlighted indicating the currently selected segment. The user first uses the sensor device 102 to highlight the selected segment. In this case, the user wishes to select the letter "H", so he or she must first select the middle segment 1930b. In this configuration, the middle segment 1930b is highlighted or selected by default, indicated in FIG. 19A with a bold line. As a result, the user does not need to move the sensor device in order to select a different segment. With the correct segment 1930b selected, the user then taps a physical surface which signals that the segment selection has been accomplished and the device 104 may now enter the key selection process. Depending on what kind of characters the virtual keyboard has, a key may correspond to a letter, a number, a symbol or any other character that may be selected through the use of a regular keyboard.

The user selected the desired segment 1930b by using his or her finger with the finger-mounted device 102 to tap a surface to select the correct keyboard segment 1930a-c. In the next action, the user selects the desired letter by swiping his or her finger toward the direction of the preferred letter. In this case, where a user is selecting the letter "H", the user moves his or her finger in a substantially straight horizontal swiping motion toward the right (illustrated by the "1" in FIG. 19A). This single swipe motion determines the selected text entry (of the letter "H"), which is then displayed in the text box 1920 as shown. In summary, the user's actions to enter the letter "H" once the device 104 was placed into text entry mode was to simply tap down on a physical surface and then swipe horizontally right (which may correspond to a tap-right input movement, for example) with the finger having the sensor device 102.

FIG. 19B is a diagram illustrating an example of a step in the process for using a finger-mounted device 102 to enter the word "HELLO" on a wearable computing device 104. Once the letter "H" has been entered as described above in FIG. 19A, a user may perform the necessary steps to enter the letter "E", which steps are illustrated in FIG. 19B. By default, the middle segment 1930b may be initially selected. The user may move his or her finger with the finger-mounted device 102 toward the left in order to highlight the first keyboard segment 1930a, where the letter E is located, and tap a surface using that finger to select the segment 1930a. Once the segment 1930a has been selected, a user may swipe his or her finger in an upward diagonal motion toward the upper right, which selects the letter E and displays it on the text box 1920 (the swiping motion is illustrated by the "2" in FIG. 19B).

FIG. 19C is a diagram illustrating an example of a step in the process for using a finger-mounted device 102 to enter the word "HELLO" on a wearable computing device 104. Once the letters "H" and "E" have been entered as described above in FIGS. 19A and 19B, a user may perform the necessary steps to enter the rest of the letters for the word "HELLO" ("LLO"), which steps are illustrated in FIG. 19C. By default, the middle segment 1930b may be initially selected. The user may move his or her finger with the finger-mounted device 102 toward the right in order to highlight the third keyboard segment 1930c and tap a surface using that finger to select the segment. Once the segment 1930c has been selected, a user may swipe his or her finger in a substantially straight motion toward the right, which selects the letter "L" (illustrated by the "3" in FIG. 19C). A user may repeat the same steps in order to select the letter "L" a second time (illustrated by the "4" in FIG. 19C). A user may select the third keyboard segment 1930c again, and then swipe his or her finger in an upward diagonal motion toward the right, which selects the letter "O" (illustrated by the "5" in FIG. 19C). As the user selects each key or letter, it appears in the text box 1920 to complete the entry of the word "HELLO."

The present systems and methods provide benefits and advantages over other text entry techniques. For example, the present systems and methods do not limit the configuration of the virtual keyboard/keypad. For example, a telephone-like 12-key keypad can be used. In one implementation, a letter is entered by tapping one key followed by a directional gesture. In another implementation, multiple tapping in a short time duration is used to select a letter from the letters assigned to the same key. Alternatively, the process of detecting gestures can be performed in the wearable computing device 104 rather than on the sensor device 102. In this case, the noise-reduced motion data is transmitted wirelessly from the sensor device 102 to the wearable computing device 104.

In addition to the embodiments mentioned earlier, the finger-mounted device 102 may be equipped with a touch sensor on the side surface of the ring. In some implementations, users touch the sensor by thumb to invoke special commands or events, such as shift, caps lock and changing the character set.

The present systems and methods offer distinguishing features beyond systems currently found on the market for recognizing text entry on a wearable device. One such feature is the detection of relative finger movements and selection of the key in the virtual keyboard/keypad that the user intends to hit. The present systems and methods provide the ability to detect a user's intention to hit (click) the selected key by a finger motion, such as tapping. The present systems and methods detect finger motion of left, right, up, down, diagonal, tapping, etc., and translate the motion into key entry for text input. Existing products on the market generally manipulate or control a computer cursor or object or detect movement related to drawing different characters such as handwriting.

In the present systems and methods, the virtual keyboard/keypad may be physically separated from the user's finger movements. Existing products on the market generally require physical contact between a user and a virtual keyboard/keypad, but this invention does not require the user to physically touch the keyboard/keypad. Further, this invention enables the user to move his or her finger wearing the finger-mounted device in free space (e.g., without regard to the location of the wearable computing device and not in any predetermined input region) and enables the use of a tapping motion against any physical surface. Existing configurations available on the market often require a device to have touch-sensitive input means, whereas this configuration requires no physical contact with a device.

The present systems and methods require smaller processing power compared to existing products on the market. Since the wearable device may not receive a continuous stream of raw data from the finger-mounted device (e.g., sensor) in some configurations, less processing power may be required, which is advantageous for small devices with limited battery capacity. In this configuration, some partial processing is done in the local device (finger-mounted device 102), which minimizes the data sent over wireless communication. The finger-mounted device 102 may send data in the form of direction of finger movement, etc., to the wearable computing device 104.

Other products for text entry on wearable devices require the use of a remote control device and a proximity sensor to detect finger motion. The present systems and methods may use only a motion sensor to detect finger motion, rather than using a motion sensor to detect position and a proximity sensor to provide scaling control for a remote control device. It differs from some systems in that the wearable device does not need to work with a touch screen and is not to create a remote haptic effect. Further, the tapping surface could be any physical surface, not a predetermined input region, and the surface does not provide location information, as other products require.

Whereas some text entry devices use a sensor to provide an indication of a scroll direction, the present systems and methods do not utilize a cursor or scrolling function and instead detect finger motion and tapping movement and translate the motion into key entries for text input. Accelerometer sensors and gyroscope sensors detect motion, but do not utilize image capture and recognition as some other existing products do. The present systems and methods may not be based on an image and may not use an image.

In some other systems, the input device may include a micro-vibration sensor, a displacement sensor, a communication unit and a microcontroller, wherein when sensing that the input device is vibrated, the micro-vibration sensor generates a vibration induction signal. The displacement sensor then senses the movement of the input device and converts the sensed movement to a movement signal; when receiving the signal, the microcontroller generates a trajectory control signal, transmits the trajectory control signal to the external electronic device through the communication unit and controls the movement trajectory of the display cursor of the external electronic device. In such other systems, a user can utilize the input device to control the movement of the display cursor of the external electronic device and conveniently draw a required trajectory on the external electronic device. The present systems and methods are different in that they include a finger-mounted device worn on a finger to detect finger motion in free space and tapping on a physical surface, and the present systems and methods then translate the motion into key entry for text input. The present systems and methods are different from this other system that requires a micro-vibration sensor and a displacement sensor because they operate differently. In addition, the present systems and methods do not utilize a micro-vibration sensor.

In yet another system, laser scanning may be used. A digital circuit analyzes a position sensor to obtain data of a finger position and to recognize a knocking finger as well as to recognize a moving mode of the hand. However, the present systems and methods use an accelerometer and gyro sensors to detect motion and do not use laser scanning.

Figure 20:
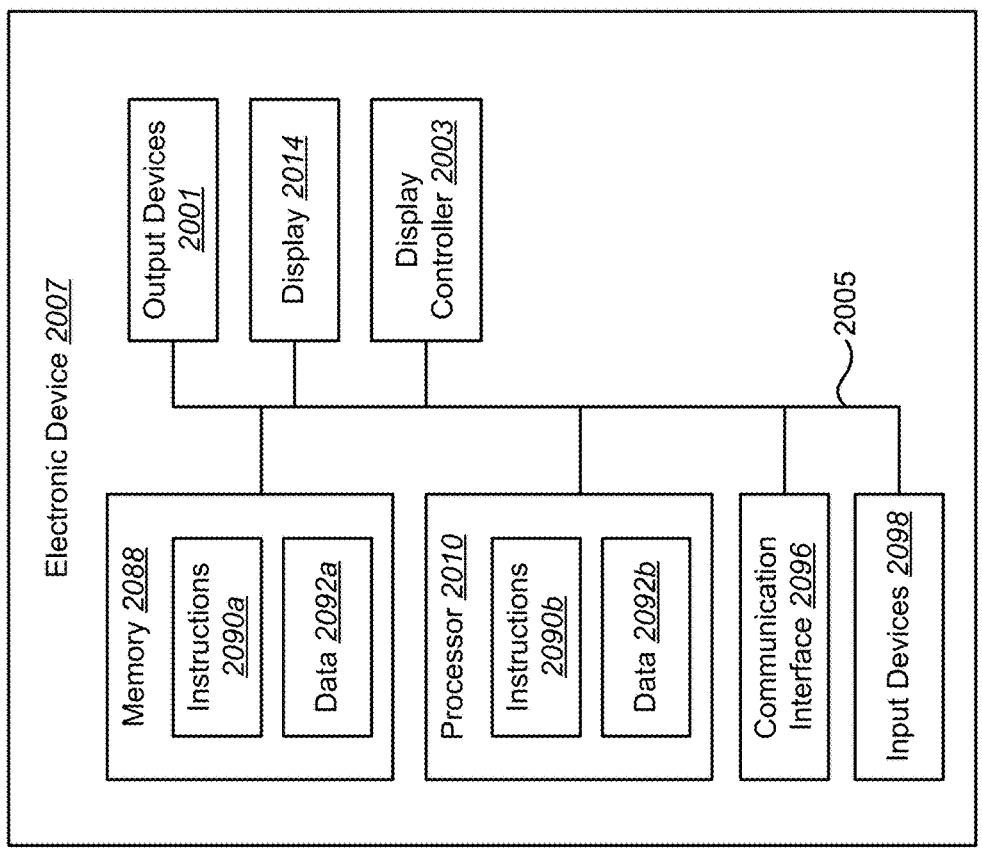
FIG. 20 illustrates various components that may be utilized in an electronic device.

FIG. 20 illustrates various components that may be utilized in an electronic device 2007 generally. Embodiments of electronic devices 2007 may include, for example, a more general configuration of a finger-mounted device 102, a more general configuration of a wearable computing device 104 or a more general configuration of another device.

The electronic device 2007 includes a processor 2010 that controls operation of the electronic device 2007. The processor 2010 may also be referred to as a central processing unit (CPU). Memory 2088, which may include both read-only memory (ROM), random access memory (RAM) or any type of device that may store information, provides instructions 2090a and data 2092a to the processor 2010. A portion of the memory 2088 may also include non-volatile random access memory (NVRAM). Instructions 2090b and data 2092b may also reside in the processor 2010. Instructions 2090b and/or data 2092b loaded into the processor 2010 may also include instructions 2090a and/or data 2092a from memory 2088 that were loaded for execution or processing by the processor 2010. The instructions 2090b may be executed by the processor 2010 to implement the systems and methods disclosed herein.

The electronic device 2007 may include one or more communication interfaces 2096 for communicating with other electronic devices. The communication interfaces 2096 may be based on wired communication technology, wireless communication technology, or both. Examples of communication interfaces 2096 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The electronic device 2007 may include one or more output devices 2001 and one or more input devices 2098. Examples of output devices 2001 include a speaker, printer, etc. One type of output device that may be included in an electronic device 2007 is a display device 2014. Display devices 2014 used with configurations disclosed herein may utilize any suitable image projection technology, such as a cathode ray tube (CRT), liquid crystal display (LCD), light-emitting diode (LED), gas plasma, electroluminescence or the like. A display controller 2003 may be provided for converting data stored in the memory 2088 into text, graphics and/or moving images (as appropriate) shown on the display 2014. Examples of input devices 2098 include a keyboard, mouse, microphone, remote control device, button, joystick, trackball, touchpad, touchscreen, lightpen, etc.

The various components of the electronic device 2007 are coupled together by a bus system 2005, which may include a power bus, a control signal bus and a status signal bus, in addition to a data bus. However, for the sake of clarity, the various buses are illustrated in FIG. 20 as the bus system 2005. The electronic device 2007 illustrated in FIG. 20 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, Electrically Erasable Programmable Read-Only Memory (EEPROM), Compact Disc Read-Only Memory (CD-ROM) or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An electronic device for detecting input movement, comprising:
a processor configured to:
obtain an acceleration signal from a finger-mounted device;
obtain a rotation signal from the finger-mounted device; and
determine an input movement based on at least one peak amplitude of at least one of the acceleration signal and the rotation signal;
determine whether a directional movement is detected based on at least one of the acceleration signal and the rotation signal and, when a sideways movement is detected, the processor determining whether the direction of sideways movement is left or right;
determining whether a positive peak amplitude of the acceleration signal is greater than a positive peak threshold and determining whether a negative peak amplitude of the acceleration signal is less than a negative peak threshold; and
determining an order of peak amplitudes, wherein the direction of sideways movement is determined by whether a positive peak amplitude occurs before a negative peak amplitude or a negative peak amplitude occurs before a positive peak amplitude.

2. The electronic device of claim 1, wherein the processor is configured to pre-process the acceleration signal and the rotation signal.

3. The electronic device of claim 1, wherein the processor is configured to determine whether a tap is detected based on at least one of the acceleration signal and the rotation signal.

4. The electronic device of claim 1, wherein the processor is configured to determine whether a peak amplitude of the acceleration signal is higher than a tap threshold to determine whether a tap is detected.

5. The electronic device of claim 1, wherein the processor is configured to determine an up movement based on a rotational signal peak and an accelerometer signal peak.

6. The electronic device of claim 1, wherein the electronic device is the finger-mounted device or is a separate electronic device.

7. The electronic device of claim 1, wherein the processor is configured to select a key based on the input movement.

8. The electronic device of claim 1, wherein the processor is configured to present visual feedback for the input movement on a display.

9. A method for detecting input movement, comprising:
obtaining an acceleration signal from a finger-mounted device;
obtaining a rotation signal from the finger-mounted device;
determining an input movement based on at least one peak amplitude of at least one of the acceleration signal and the rotation signal;
determining the input movement further comprising:
determining whether a directional movement is detected based on at least one of the acceleration signal and the rotation signal;
determining whether a positive peak amplitude of the acceleration signal is greater than a positive peak threshold; and
determining whether a negative peak amplitude of the acceleration signal is less than a negative peak threshold; and
determining whether a positive peak amplitude occurs before a negative peak amplitude or a negative peak amplitude occurs before a positive leak amplitude the input movement comprises determining a left movement in a case that the positive peak occurs before the negative peak or a right movement in a case that the negative peak occurs before the positive peak.

10. The method of claim 9, further comprising pre-processing the acceleration signal and the rotation signal.

11. The method of claim 9, wherein determining the input movement comprises determining whether a tap is detected based on at least one of the acceleration signal and the rotation signal.

12. The method of claim 9, wherein determining the input movement comprises determining whether a peak amplitude of the acceleration signal is higher than a tap threshold to determine whether a tap is detected.

13. The method of claim 9, wherein determining the input movement comprises determining an up movement based on a rotational signal peak and an accelerometer signal peak.

14. The method of claim 9, further comprising selecting a key based on the input movement.

15. The method of claim 9, further comprising presenting visual feedback for the input movement on a display.

16. A non-transitory computer-readable medium having instructions thereon, the instructions comprising:
code for causing an electronic device to obtain an acceleration signal from a finger-mounted device;
code for causing the electronic device to obtain a rotation signal from the finger-mounted device; and
code for causing the electronic device to determine an input movement direction based on at least one peak of at least one of the acceleration signal and the rotation signal; and
the code for causing the electronic device to determine an input movement direction further comprising code for:
determining whether a directional movement is detected based on at least one of the acceleration signal and the rotation signal;
determining whether a positive peak amplitude of the acceleration signal is greater than a positive peak threshold; and
determining whether a negative peak amplitude of the acceleration signal is less than a negative peak threshold; and
determining whether a positive peak amplitude occurs before a negative peak amplitude or a negative peak amplitude occurs before a positive peak amplitude.

* * * * *

UNITED STATES PATENT AND TRADEMARK OFFICE
CERTIFICATE OF CORRECTION

PATENT NO. : 10,048,768 B2
APPLICATION NO. : 15/004230
DATED : August 14, 2018
INVENTOR(S) : Hong Jin and Atsushi Ishii Page 1 of 1

It is certified that error appears in the above-identified patent and that said Letters Patent is hereby corrected as shown below:

In the Claims

Claim 9, Column 25, Line 21, delete "leak" and substitute therefor --peak--;

Claim 9, Column 25, Line 21, after "a positive peak amplitude" insert --; wherein--.

Signed and Sealed this
Fourth Day of June, 2019

Andrei Iancu
*Director of the United States Patent and Trademark Office*